US012253811B2

(12) United States Patent
Sunahara et al.

(10) Patent No.: US 12,253,811 B2
(45) Date of Patent: Mar. 18, 2025

(54) DEVELOPING DEVICE

(71) Applicant: CANON KABUSHIKI KAISHA, Tokyo (JP)

(72) Inventors: Satoshi Sunahara, Tokyo (JP); Satoru Motohashi, Chiba (JP); Go Shindo, Shizuoka (JP); Shuhei Tokiwa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/212,279

(22) Filed: Jun. 21, 2023

(65) Prior Publication Data

US 2023/0418180 A1 Dec. 28, 2023

(30) Foreign Application Priority Data

Jun. 24, 2022 (JP) ................................ 2022-102252

(51) Int. Cl.
*G03G 15/08* (2006.01)

(52) U.S. Cl.
CPC ..... *G03G 15/0856* (2013.01); *G03G 15/0862* (2013.01); *G03G 15/0889* (2013.01); *G03G 2215/085* (2013.01)

(58) Field of Classification Search
CPC ........... G03G 15/1856; G03G 15/0858; G03G 15/086; G03G 15/0862; G03G 15/0887; G03G 15/0889; G03G 2215/0802; G03G 2215/085; G03G 2215/0888; G03G 2215/0891; G03G 2215/0894; G03G 2215/0897
See application file for complete search history.

(56) References Cited

U.S. PATENT DOCUMENTS

| | | | | |
|---|---|---|---|---|
| 9,063,507 B2 | 6/2015 | Gofuku et al. | | |
| 2002/0061196 A1* | 5/2002 | Miyamoto | ......... | G03G 21/1814 399/27 |
| 2008/0247784 A1* | 10/2008 | Kakuta | .............. | G03G 15/0877 399/262 |

(Continued)

FOREIGN PATENT DOCUMENTS

JP 2014-066899 A 4/2014

*Primary Examiner* — Carla J Therrien
(74) *Attorney, Agent, or Firm* — VENABLE LLP

(57) ABSTRACT

A developing device in an apparatus main body of an image forming device includes a developing container having an accommodation chamber to accommodate a developer and a developing chamber communicating with the accommodation chamber through a communication port, with the accommodation chamber and developing chamber being integrally formed such that the developing chamber is disposed below the accommodation chamber in a state where the developing device is in use in the apparatus main body. The developer container includes an abutting surface which forms the accommodation chamber and abuts a second end portion of a sheet opposite to a first end portion such that the sheet is maintained in a bent state until the second end portion of the sheet passes in front of an upstream end of the communication port in a rotation direction of the conveyance member and then reaches a light guide provided in the accommodation chamber.

19 Claims, 29 Drawing Sheets

(56) References Cited

U.S. PATENT DOCUMENTS

| | | | | |
|---|---|---|---|---|
| 2009/0297178 | A1* | 12/2009 | Kakuta | G03G 15/0855 399/27 |
| 2015/0212451 | A1* | 7/2015 | Shirakata | G03G 15/0887 399/281 |
| 2016/0252874 | A1* | 9/2016 | Fujiwara | G03G 21/1676 399/27 |
| 2019/0235413 | A1* | 8/2019 | Kanno | G03G 15/0889 |

* cited by examiner

DEVELOPING DEVICE

BACKGROUND OF THE INVENTION

Field of the Invention

The present disclosure relates to a developing device.

Description of the Related Art

In an image forming device adopting an electrophotographic system, the surface of an electrophotographic photoreceptor (hereinafter referred to as a photosensitive drum) is uniformly charged by a charging means, and the charged photosensitive drum surface is exposed by an exposure means to form an electrostatic latent image. In addition, the electrostatic latent image is developed by a developing device to form a toner image on the photosensitive drum using a developer (hereinafter also referred to as a toner), and this toner image is transferred to a recording material by a transfer means. Thereafter, the toner image is fixed on the recording material by a fixing means and is output as an image.

Furthermore, in order to improve usability, there is a developing device including a toner remaining amount detecting means for detecting a remaining amount of toner used for development in an accommodation chamber of the developing device and notifying a user of the remaining amount of toner. Japanese Patent Application Publication No. 2014-066899 discloses a technique for forming an optical path for detection light introduced from the outside on a conveyance path of a toner conveyed from the bottom of a container toward a developer communication port by a conveyance member, and detecting a remaining amount of toner based on a period of time for which the optical path is blocked by the conveyed toner.

SUMMARY OF THE INVENTION

In Japanese Patent Application Publication No. 2014-066899, a remaining amount detection unit is provided upstream of the communication port for supplying a toner from a toner accommodation chamber to a developing chamber provided with a developing roller in a rotation direction of the conveyance member, but a configuration in which the remaining amount detection unit is provided downstream of the communication port is also conceivable.

An object of the present disclosure is to accurately detect a remaining amount of toner in a configuration in which a remaining amount detection unit is provided downstream of a communication port in a rotation direction of a conveyance member.

The present disclosure includes a developing device for use in an apparatus main body of an image forming device, the developing device comprising:

- a developing container including an accommodation chamber configured to accommodate a developer and a developing chamber communicating with the accommodation chamber through a communication port;
- a developer carrier configured to carry the developer, the developer carrier being;
- a conveyance member configured to convey the developer in the accommodation chamber toward the communication port by a sheet, the conveyance member including a rotation shaft and the sheet which is flexible and has a first end fixed to the rotation shaft in a direction perpendicular to the rotation shaft, the conveyance member being provided in the accommodation chamber so as to rotate around a rotation axis;
- a light transmitting member provided in the developing container, the light transmitting member being configured to transmit light from outside of the developing device into the accommodation chamber and from inside of the accommodation chamber toward outside of the developing device and being positioned above the communication port when the developing device is in use in the apparatus main body; and
- an abutting portion configured to abut on a second end of the sheet opposite to the first end in the direction perpendicular to the rotation shaft such that the sheet is maintained in a bent state until the second end passes in front of the communication port from an upstream end of the communication port in a rotation direction of the conveyance member and then reaches the light transmitting member.

The present disclosure includes a developing device for use in an apparatus main body of an image forming device, the developing device comprising:

- a developing container including an accommodation chamber configured to accommodate a developer and a developing chamber communicating with the accommodation chamber through a communication port;
- a developer carrier configured to carry the developer, the developer carrier being provided in the developing chamber;
- a conveyance member configured to convey the developer in the accommodation chamber toward the communication port by a sheet, the conveyance member including a rotation shaft and the sheet which is flexible and has a first end fixed to the rotation shaft in a direction perpendicular to the rotation shaft, the conveyance member being provided in the accommodation chamber so as to rotate around a rotation axis;
- a pair of electrodes configured to apply a voltage from outside of the accommodation chamber, the pair of electrodes being positioned above the communication port in a state where the developing device is in use in the apparatus main body; and
- an abutting portion configured to abut on a second end of the sheet opposite to the first end in the direction perpendicular to the rotation shaft such that the sheet is maintained in a bent state until the second end passes in front of the communication port from an upstream end of the communication port in a rotation direction of the conveyance member and then reaches the pair of electrodes.

The present disclosure includes a cartridge that is detachable from an apparatus main body of an image forming device, the cartridge comprising:

- a developing container including an accommodation chamber configured to accommodate a developer and a developing chamber communicating with the accommodation chamber through a communication port;
- a developer carrier configured to carry the developer, the developer carrier being provided in the developing chamber;
- a conveyance member configured to convey the developer in the accommodation chamber toward the communication port by a sheet, the conveyance member including a rotation shaft and the sheet which is flexible and has one end fixed to the rotation shaft in a direction perpendicular to the rotation shaft, the conveyance member being provided in the accommodation chamber so as to rotate around a rotation axis;

a light transmitting member provided in the developing container, the light transmitting member being configured to transmit light from outside of the cartridge into the accommodation chamber and from inside of the accommodation chamber toward outside of the cartridge and being positioned above the communication port when the cartridge is oriented in a direction in which the cartridge is mounted on the apparatus main body; and a connecting portion extending from an upstream end to a downstream end of the communication port in a rotation direction of the conveyance member and connecting the upstream end to the downstream end, and the connecting portion being configured to abut on the sheet when the conveyance member is rotated.

According to the present disclosure, it is possible to accurately detect a remaining amount of toner in a configuration in which a remaining amount detection unit is provided downstream of a communication port in a rotation direction of the conveyance member.

Further features of the present invention will become apparent from the following description of exemplary embodiments with reference to the attached drawings.

DESCRIPTION OF THE EMBODIMENTS

Embodiments for implementing the present disclosure will be described below with reference to the drawings. Note that the following embodiments do not limit the scope of claims, and not all combinations of features described in the embodiments are essential to a solution of the disclosure.

Example 1

Overall Configuration of Image Forming Device

Figure 2:
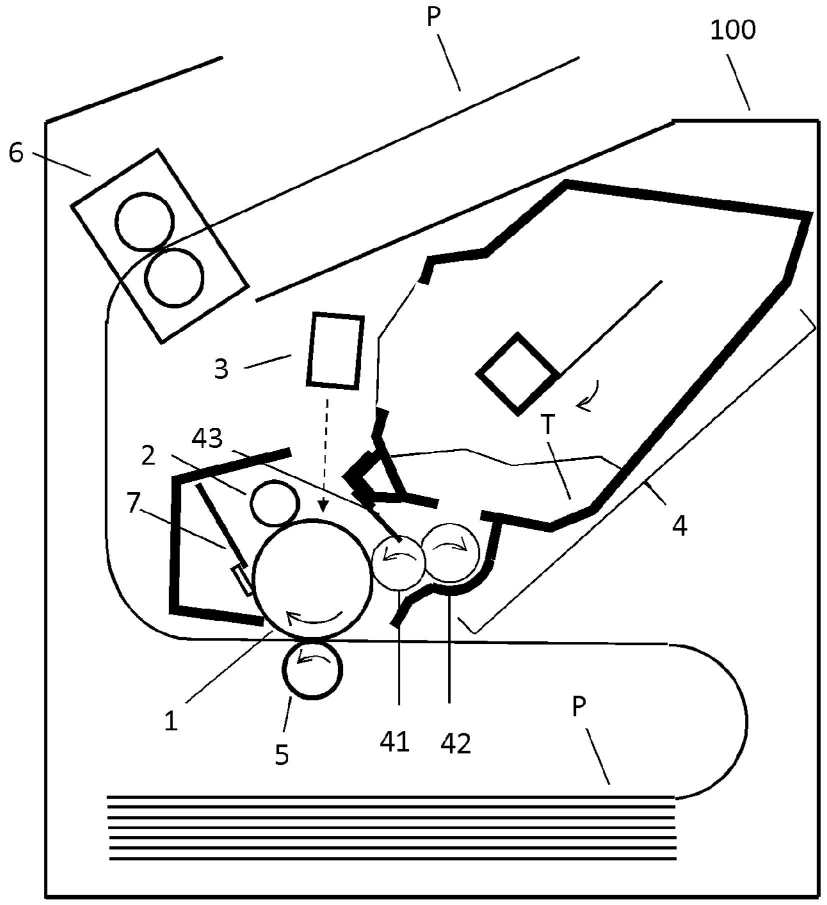
FIG. 2 is a diagram illustrating an image forming device including a developing device in Example 1.

A cross-sectional view of the overall configuration of an image forming device including a developing device according to Example 1 of the present disclosure will be described with reference to FIG. 2.

An image forming device 100 according to Example 1 includes a photosensitive drum 1, a charging roller 2, an exposure device 3, a developing device 4, a transfer roller 5, and a fixing device 6. The charging roller 2 charges the surface of the photosensitive drum 1. The exposure device 3 forms an electrostatic latent image corresponding to image data on the charged photosensitive drum 1. The developing device 4 develops the electrostatic latent image formed on the surface of the photosensitive drum 1 by using a developer T. The transfer roller 5 abuts on the photosensitive drum 1 to transfer a toner image onto a recording material P. The fixing device 6 heats and presses the recording material P to fix the toner image. In addition, the image forming device 100 is equipped with a power supply, which is not illustrated in the drawing, for applying a predetermined voltage to the charging roller 2, the developing device 4, the transfer roller 5, and the like, respectively. The developing device 4 is configured as a development cartridge that is attachable to and detachable from the apparatus main body of the image forming device 100. FIG. 2 illustrates a state where the development cartridge is mounted on the apparatus main body.

The photosensitive drum 1 is an image carrier in which a negatively charged organic photoreceptor is formed on a cylindrical cylinder. In addition, the photosensitive drum 1 has a diameter of ϕ24 mm and is rotationally driven by a motor in a predetermined direction (clockwise direction in the drawing) at a predetermined process speed. The photosensitive drum 1 in Example 1 is rotationally driven at a process speed of 250 mm/sec.

Regarding the charging roller 2, the charging roller 2 to which a predetermined charging voltage is applied by a power supply not illustrated in the drawing is a charging means for coming into contact with the rotating photosensitive drum 1 with a predetermined pressure contact force and uniformly charging the surface of the photosensitive drum 1 to a predetermined potential. In Example 1, the photosensitive drum 1 is negatively charged by the charging roller 2. The potential charged by the charging roller 2 is referred to as a dark part potential.

The exposure device 3 is an exposure means for performing exposure corresponding to image data input from external equipment or a reading device. In Example 1, the exposure device 3 is a scanner unit that scans the surface of the photosensitive drum 1 with a semiconductor laser. Note that, as the exposure device 3, an LED exposure device including an LED array in which a plurality of LEDs are arranged along the longitudinal direction of the photosensitive drum 1 can also be used. The surface of the photosensitive drum 1 having a dark part potential is exposed by the exposure device 3, and a potential attenuated to the vicinity of a ground potential is referred to as a bright part potential. An electrostatic latent image is formed by forming an exposed part and a non-exposed part on the photosensitive drum 1 in response to the image data.

The developing device 4 is a developing means including a developing roller 41 as a developer carrier that carries a developer, a developing container serving as a frame of the developing device 4, a supply roller 42 capable of supplying a developer to the developing roller 41, and a developing blade 43 that regulates the amount of developer. The developing roller 41 and the supply roller 42 are rotatably supported by the developing container. The developing roller 41 rotates in a direction opposite to the photosensitive drum 1 (counterclockwise in the drawing), and the supply roller 42 rotates in a direction opposite to the developing roller 41 (clockwise in the drawing). In addition, the developing roller 41 is disposed at an opening of the developing container so as to face the photosensitive drum 1. The supply roller 42 rotatably abuts on the developing roller 41, and the developer contained in the developing container is applied to the surface of the developing roller 41 by the supply roller 42. The developing blade 43 is an elastic member and is disposed in contact with the developing roller 41 while being bent against its elasticity. A toner carried on the surface of the developing roller 41 by the developing blade 43 has a predetermined layer thickness and is conveyed to a developing chamber that faces the photosensitive drum 1.

In Example 1, a developing method of the developing device 4 is, for example, a contact developing method. In the contact developing method, a toner layer carried on the developing roller 41 contacts the photosensitive drum 1 in a developing chamber (developing region) where the photosensitive drum 1 faces the developing roller 41. A developing voltage is applied to the developing roller 41 by a power source which is not illustrated in the drawing. Under the developing voltage, the toner carried by the developing roller 41 is transferred from the developing roller 41 to the surface of the photosensitive drum in accordance with the potential of the surface of the photosensitive drum 1, thereby developing the electrostatic latent image on the photosensitive drum 1 into a toner image.

In Example 1, as an example, a toner is produced by a polymerization method, is spherical with a particle size of 7 μm, and is a polymerized toner in which a negative polarity is a regular charging polarity. In addition, the toner in Example 1 is a non-magnetic one-component developer that does not contain a magnetic component and is carried on the developing roller 41 mainly by an intermolecular force or an electrostatic force (mirror image force). In addition to a toner particle, the one-component developer may contain additives (for example, wax or fine silica particles) for adjusting the fluidity and charging performance of the toner. In addition, as the developer, a magnetic one-component developer containing a magnetic component, or a two-component developer constituted by a non-magnetic toner and a magnetic carrier may be used. When a magnetic developer is used, a cylindrical developing sleeve with a magnet disposed inside may be used as the developer carrier.

The transfer roller 5 is a transfer means for transferring the toner image carried on the photosensitive drum 1 onto the recording material P by the transfer roller 5 to which a transfer voltage is applied from a power supply which is not illustrated in the drawing. The recording material P having the toner image transferred thereto is transported to the fixing device 6.

The fixing device 6 is a thermal fixing type fixing means for fixing an image by heating and melting a toner on the recording material P. The fixing device 6 includes a fixing film, a fixing heater such as a ceramic heater that heats the fixing film, a thermistor that measures the temperature of the fixing heater, and a pressure roller that presses against the fixing film.

The recording material P that has passed through the fixing device 6 is discharged and stacked on a discharge tray as a stacking portion formed on an upper portion of the main body of the image forming device 100 by a pair of discharge rollers as a discharge means.

A developer that is not transferred to the recording material P and remains on the photosensitive drum 1 is removed from the photosensitive drum 1 by a cleaning device 7 disposed downstream of the transfer roller 5 with respect to the rotation direction of the photosensitive drum 1, and is accumulated in the cleaning device 7. In Example 1, as an example of the cleaning device 7, a cleaning blade is configured such that urethane rubber supported and fixed to a sheet metal is brought into contact with the sheet metal in a counter direction with respect to the rotation direction of the photosensitive drum 1.

Structure of Developing Device

Figure 3:
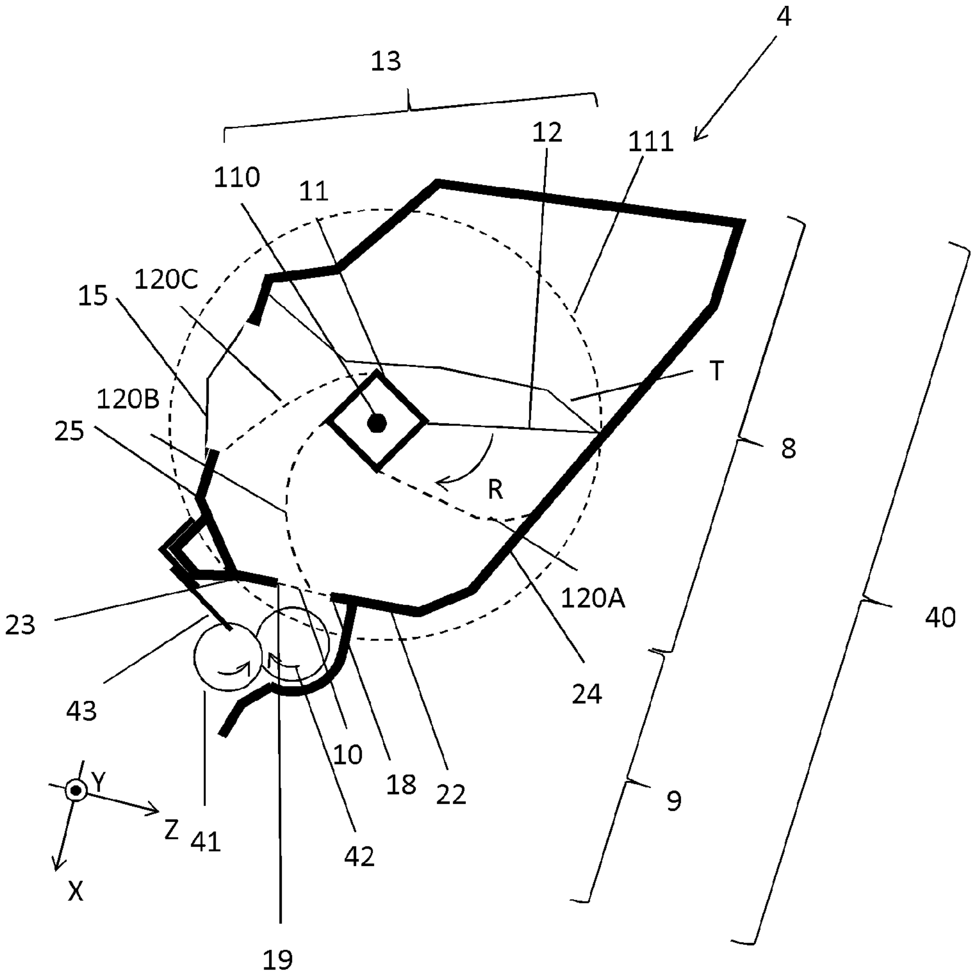
FIG. 3 is a diagram illustrating the developing device in Example 1 in detail.

A configuration of the developing device 4 in Example 1 will be described with reference to FIG. 3. FIG. 3 illustrates the cross-section of the developing device 4 taken along a plane that is perpendicular to the direction parallel to the developing roller 41 in a state where a developing cartridge including the developing device 4 is mounted on the apparatus main body of the image forming device 100.

The developing device 4 includes a developing container 40 including an accommodation chamber 8 configured to accommodate a toner and a developing chamber 9 communicating with the accommodation chamber 8 through a communication port 10. The developing chamber 9 is provided with a developer carrier configured to carry a toner in order to develop an electrostatic latent image formed on the photosensitive drum 1 using the toner supplied from the accommodation chamber 8. The up-down direction in FIG. 3 generally corresponds to the vertical up-down direction in a state where the developing device 4 is provided in the apparatus main body of the image forming device 100, and the image forming device 100 is installed on a horizontal plane (hereinafter also referred to as a state of use). In the state of use, the developing chamber 9 is positioned below the accommodation chamber 8, the developing roller 41 is positioned below the communication port 10, the bottom of the developing chamber 9 is positioned below the bottom of the accommodation chamber 8, and the communication port 10 is positioned at the bottom of the accommodation chamber 8. The accommodation chamber 8 is provided with a remaining amount detection unit 15 for detecting the amount of toner remaining in the accommodation chamber 8. At a boundary between the accommodation chamber 8 and the developing chamber 9, the communication port 10, which is an opening for enabling the accommodation chamber 8 to communicate with the developing chamber 9 and enabling a developer supplied from the accommodation chamber 8 to the developing chamber 9 to pass therethrough, is provided.

The communication port 10 is a substantially rectangular opening formed by a first communication port end portion 18 and a second communication port end portion 19 in a direction intersecting the longitudinal direction of the developing roller 41, and a third communication port end portion 20 and a fourth communication port end portion 21 in the longitudinal direction of the developing roller 41. Details of the communication port 10 will be described later. In FIG. 3, a dashed line connecting the first communication port end portion 18 and the second communication port end portion 19 indicates the communication port 10. The accommodation chamber 8 is positioned above the communication port 10, and the developing chamber 9 is positioned below the communication port 10. Thus, the developing chamber 9 is provided below the accommodation chamber 8, and the communication port 10 is provided at the bottom of the accommodation chamber 8.

Hereinafter, a direction from the second communication port end portion 19 to the first communication port end portion 18 is set to be a Z direction, a direction parallel to the developing roller 41 and toward the back of the paper surface of FIG. 3 is set to be a Y direction, and a direction perpendicular to the Y direction and the Z direction and from accommodation chamber 8 toward the developing chamber 9 is set to be an X direction.

A conveyance member 13 being configured to convey a developer from the accommodation chamber 8 to the developing chamber 9 through the communication port 10 is provided inside the accommodation chamber 8. The conveyance member 13 includes a rotation shaft 11 configured to rotate and a sheet 12 made of a flexible elastic body having a first end fixed to the rotation shaft 11. The conveyance member 13 is rotatable in the direction of an arrow R (clockwise when viewed in the Y direction) around a rotation axis 110 of the rotation shaft 11 so as to convey a toner in the accommodation chamber toward the communication port 10 by the sheet 12. The rotation direction R of the conveyance member 13 is the same as the rotation direction of the supply roller 42 and the photosensitive drum 1 and opposite to the rotation direction of the developing roller 41. The communication port 10 is positioned below the rotation axis 110 of the rotation shaft 11 in a state where the developing device 4 is provided in the apparatus main body of the image forming device 100, and the image forming device 100 is installed on a horizontal surface (a state of use). In the state of use, the remaining amount detection unit 15 is positioned above the communication port 10 in the developing container 40 so as to transmit light from the outside of the developing device 4 toward the inside of the accommodation chamber 8 and transmit the light from the inside of the accommodation chamber 8 toward the outside of the developing device 4. In other words, the remaining amount detection unit 15 is provided above the communication port 10 in a case where the cartridge including the developing device 4 is oriented in a direction in which it is mounted on the apparatus main body. The remaining amount detection unit 15 includes a light transmitting member capable of transmitting detection light for detecting a remaining amount of toner in the accommodation chamber 8 on a downstream side of the communication port 10 in the rotation direction R of the conveyance member 13. When the sheet 12 of the conveyance member 13 rotates in the R direction and passes in front of the communication port 10, the sheet 12 reaches the remaining amount detection unit 15. The remaining amount detection unit 15 has a concave shape when viewed from the inside of the accommodation chamber 8, in other words, a shape protruding toward the outside of the accommodation chamber 8. The remaining amount detection unit 15 can detect a remaining amount of toner in the accommodation chamber 8 by measuring detection light having passed through a light path formed in the accommodation chamber 8 by the light transmitting member.

In Example 1, the sheet 12 is constituted by a polycarbonate (PC) sheet with a thickness of 150 μm. The radius of rotation of the sheet 12 is 25 mm. Here, the radius of rotation is defined by a length from one end to the other end of the sheet 12 in an unbent state (a distance from the rotation axis of the rotation shaft 11 to a tip end portion of the PC sheet). The length of the sheet 12 in a direction parallel to the rotation shaft 11 (Y direction) is 220 mm.

In the inner wall surface of the bottom of the accommodation chamber 8, a portion positioned upstream in the rotation direction R of the conveyance member 13 from the first communication port end portion 18 (upstream end) of the communication port 10 is set to be a bottom upstream inner wall surface 22, and a distance from the rotation axis 110 of the conveyance member 13 to the bottom upstream inner wall surface 22 is set to be L1.

In the inner wall surface of the bottom of the accommodation chamber 8, a portion positioned downstream in the rotation direction R of the conveyance member 13 from the second communication port end portion 19 (downstream end) of the communication port 10 is set to be a bottom downstream inner wall surface 23, and a distance from the rotation axis 110 of the conveyance member 13 to the bottom downstream inner wall surface 23 is set to be L2.

In the inner wall surface of the side portion of the accommodation chamber 8, a portion positioned upstream in the rotation direction R of the conveyance member 13 from the bottom upstream inner wall surface 22 is set to be a side upstream inner wall surface 24, and a distance from the rotation axis 110 of the conveyance member 13 to the side upstream inner wall surface 24 is set to be L3.

In the inner wall surface of the side portion of the accommodation chamber 8, a portion positioned downstream in the rotation direction R of the conveyance member 13 from the bottom downstream inner wall surface 23 is set to be a side downstream inner wall surface 25, and a distance from the rotation axis 110 of the conveyance member 13 to the side downstream inner wall surface 25 is set to be L4.

The remaining amount detection unit 15 is provided on a side portion that rises upward from the bottom of the accommodation chamber 8 in the state of use.

A distance from the rotation axis 110 of the conveyance member 13 to the communication port 10 (a portion between the first communication port end portion 18 and the second communication port end portion 19) is set to be L5. A distance (the radius of rotation of the sheet 12) from the rotation axis 110 of the conveyance member 13 to the tip end portion of the sheet 12 is set to be LD. In Example 1, LD is set to 25 mm, and a configuration in which L1<LD, L2<LD, and L5<LD are established is adopted. In addition, a configuration is adopted in which L3<LD is established at least below an upper end of a region with toner with full as a remaining amount of toner. In addition, a configuration is adopted in which a size relationship of L4<LD is established at least below an upper end of a region where the remaining amount detection unit 15 is provided. In other words, the bottom upstream inner wall surface 22, the bottom downstream inner wall surface 23, and the communication port 10 are provided inside a virtual circle 111 centered on the rotation axis (rotation shaft line) 110 of the rotation shaft 11 and having the rotation radius LD of the sheet 12 as a radius. In addition, at least a portion below the upper end of the region with a toner when a remaining amount of toner is full in the side upstream inner wall surface 24 and at least a portion below the upper end of the region provided with the remaining amount detection unit 15 in the side downstream inner wall surface 25 are provided inside the virtual circle 111.

With such a dimensional relationship, the tip end portion of the sheet 12 abuts on the side upstream inner wall surface 24 in the region where L3<LD is established, and is bent and deformed as indicated by a dashed line 120A. In addition, the tip end portion of the sheet 12 abuts on the bottom downstream inner wall surface 23 via the communication port 10 from the bottom upstream inner wall surface 22 and is bent and deformed as indicated by a dashed line 120B. In addition, the tip end portion of the sheet 12 abuts against the side downstream inner wall surface 25 in a region where L4<LD is established, and is bent and deformed as indicated by a dashed line 120C.

The communication port 10, the bottom downstream inner wall surface 23, and the side upstream inner wall surface 24 are abutting portions that abut a second end portion of the sheet 12 while the second end portion on a side opposite to a first end portion of the sheet 12 passes in front of (before) the communication port 10 from an upstream end (first communication port end portion 18) in front of the communication port 10 and reaches the remaining amount detection unit 15. The abutting portions are configured to abut on the second end portion of the sheet 12 so that the bent state of the sheet 12 is maintained. In addition to these, the bottom upstream inner wall surface 22 and the side upstream inner wall surface 24 are abutting portions that abut on the second end portion of the sheet 12 while the second end portion passes in front of the communication port from a predetermined position on an upstream side of the communication port 10 in the rotation direction and reaches the remaining amount detection unit 15. A length from the first end portion of the sheet 12 in an unbent state to the tip end of the second end portion is longer than a distance from the rotation shaft 11 to these abutting portions. That is, the abutting portions include the bottom downstream inner wall surface 23 and the side downstream inner wall surface 25 which are inner wall surfaces of the accommodation chamber 8 in a range from the downstream end (second communication port end portion 19) of the communication port 10 to the remaining amount detection unit 15 in the rotation direction.

Figure 4:
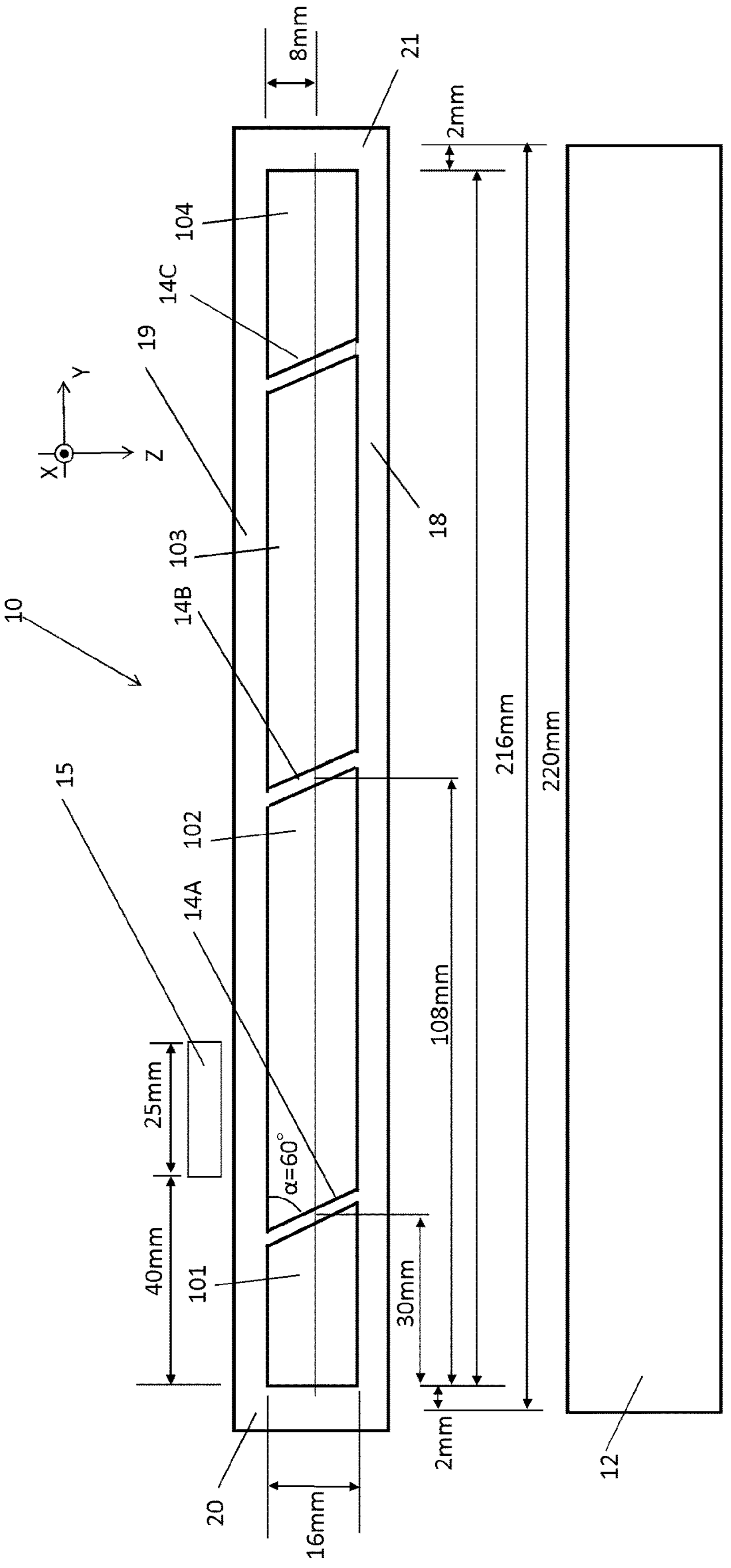
FIG. 4 is a diagram illustrating a configuration of the communication port in Example 1 and a positional relationship between a remaining amount detection unit and a sheet.

FIG. 4 is a diagram illustrating a configuration of the communication port 10 and a positional relationship between the remaining amount detection unit 15 and the sheet 12. FIG. 4 illustrates the communication port 10 when viewed in a direction from the accommodation chamber 8 toward the developing chamber 9 (+X direction). An opening is formed between the first communication port end portion 18 and the second communication port end portion 19 so that a developer can be supplied to the developing chamber 9. At least one connecting portion 14 (crossing portion, bridge portion) connecting the first communication port end portion 18 (upstream end) and the second communication port end portion 19 (downstream end) is provided in the rotation direction. The at least one connecting portion 14 is a plurality of connecting portions. The plurality of connecting portions 14 are provided at intervals in a direction (Y direction, direction of the rotation axis) intersecting the conveyance direction. The connecting portion 14 is configured to extend from the upstream end to the downstream end of the communication port 10 in the rotation direction of the conveyance member 13, to connect the upstream end and the downstream end, and to abut on the sheet 12 when the conveyance member 13 is rotated. In Example 1, there are three connecting portions 14 (14A, 14B, and 14C from a side closest to the third communication port end portion 20) in the Y direction. Thus, the opening of the communication port 10 is divided into four openings (101, 102, 103, and 104 from a side close to the third communication port end portion 20) by the three connecting portions 14.

In Example 1, an angle (an angle with respect to the Y direction) a between the first communication port end portion 18, the second communication port end portion 19, and the connecting portion 14 is set to 60°. Thus, in a direction (the Y direction in Example 1) intersecting the conveyance direction of a toner, the position of the connecting portion between the connecting portion 14 and the upstream end (the first communication port end portion 18) of the communication port 10 is different from the position of the connecting portion between the connecting portion 14 and the downstream end (the second communication port end portion 19) of the communication port 10. A distance in the Z direction between the first communication port end portion 18 and the second communication port end portion 19 is set to 16 mm, a distance in the Y direction between the third communication port end portion 20 and the fourth communication port end portion 21 of the communication port 10 (the width of the opening of the communication port 10 in the Y direction) is set to 216 mm, and the width of the connecting portion 14 is set to 2 mm. A distance in the Y direction between the third communication port end portion 20 and the connecting portion 14 closest to the third communication port end portion 20, and a distance in the Y direction between the fourth communication port end portion 21 and the connecting portion 14 closest to the fourth communication port end portion 21 is set to 30 mm. A distance in the Y direction between the third communication port end portion 20 and the connecting portion 14 positioned at the center in the Y direction among the three connecting portions 14 is set to 108 mm. Note that it is preferable that the angle α of the connecting portion 14 be in the range of 45° to 75° (for the reason, see a second modification example to be described below).

In FIG. 4, the remaining amount detection unit 15 is drawn adjacent to the communication port 10 in the same drawing. This is a diagram for convenience in explaining a positional relationship in the Y direction between the communication port and the remaining amount detection unit 15, and actually, the remaining amount detection unit 15 is provided on an inner wall surface separate from the inner wall surface of the bottom of the accommodation chamber 8 in which the communication port 10 is provided. As illustrated in FIG. 4, the remaining amount detection unit 15 is provided at a position 40 mm away in the +Y direction from the position of the third communication port end portion 20 in the Y direction. The size of the remaining amount detection unit 15 in the Y direction is 25 mm, and as illustrated in FIG. 4, the remaining amount detection unit 15 is located at a position corresponding to the opening 102 in the Y direction and is located near the connecting portion 14A in the Y direction. That is, a region where the connecting portion 14 is present does not overlap with a region where the remaining amount detection unit 15 is present in a direction (Y direction, direction of the rotation axis) intersecting the conveyance direction of the toner. In the case of Example 1, the remaining amount detection unit 15 is provided between adjacent two of the plurality of connecting portions 14 in a direction (Y direction, direction of the rotation axis) intersecting the conveyance direction of the toner.

In FIG. 4, the sheet 12 is drawn adjacent to the communication port 10 in the same drawing, but this is a diagram for convenience in explaining a positional relationship between the communication port 10 and the sheet 12 in the Y direction, and actually, the sheet 12 is a member separate from the communication port 10. As illustrated in FIG. 4, the width of the sheet 12 in the Y direction is larger than the width of the opening of the communication port 10 in the Y direction, and both ends of the sheet 12 in the Y direction overlap the third communication port end portion 20 and the fourth communication port end portion 21 in the Y direction. That is, an abutting portion includes the inner wall surface of the accommodation chamber 8 adjacent to the end portion of the communication port 10 in the Y direction. In Example 1, the width of the sheet 12 in the Y direction is 220 mm, the width of an overlapping portion between one end of the sheet 12 in the Y direction and the third communication port end portion 20 is 2 mm, and the width of an overlapping portion between the other end of the sheet 12 in the Y direction and the fourth communication port end portion 21 in the Y direction is 2 mm.

Figure 5:
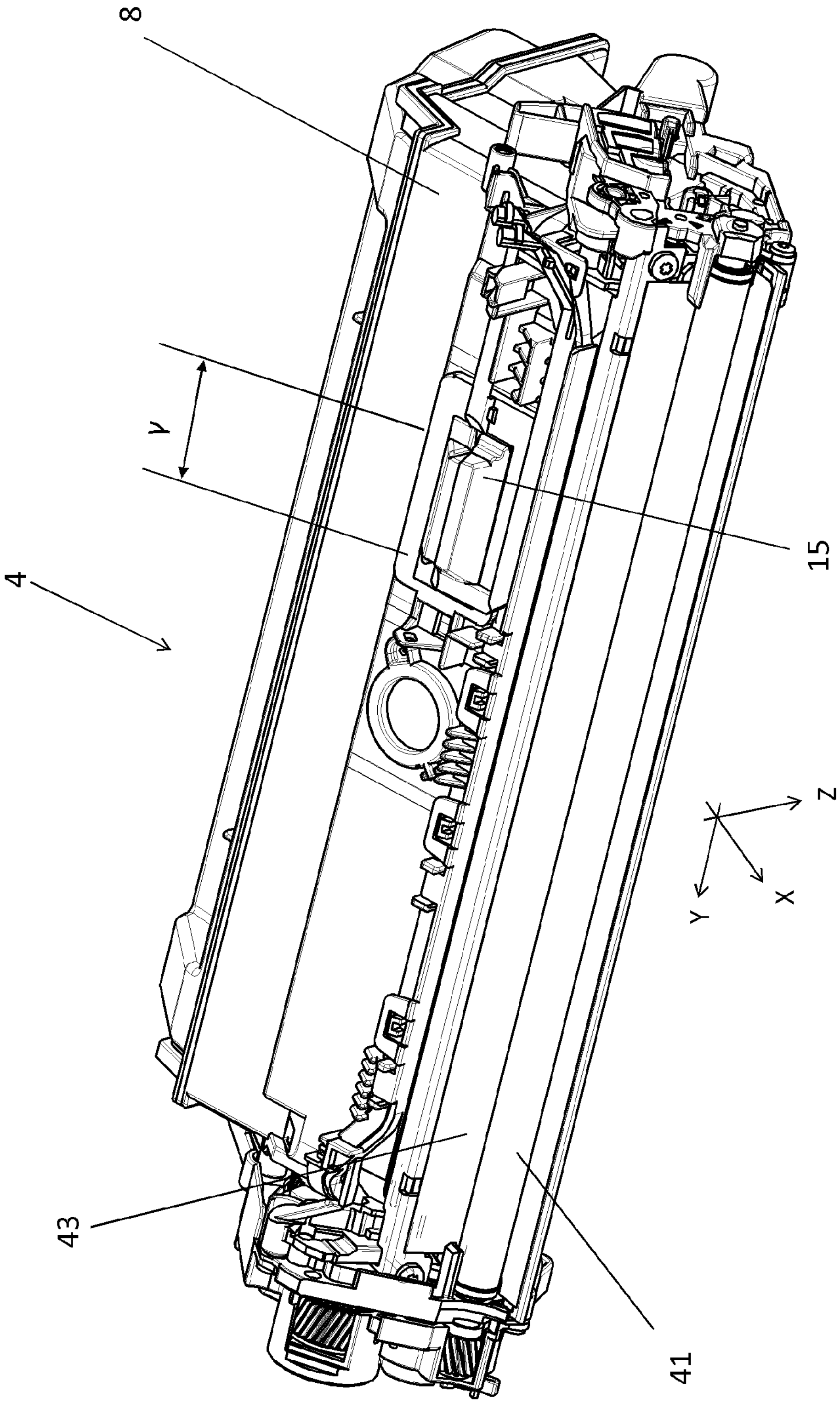
FIG. 5 is a diagram illustrating the appearance of the developing device in Example 1.

FIG. 5 is a perspective view illustrating the appearance of the developing device 4. The remaining amount detection unit 15 is disposed on the side wall of the accommodation chamber 8 in the −Z direction (a side wall drawn at the top of the accommodation chamber 8 in FIG. 5). In a direction (Y direction) parallel to the developing roller 41, a length γ of the remaining amount detection unit 15 is sufficiently shorter than the lengths of the developing roller 41, the developing blade 43, and the like.

Figure 6A:
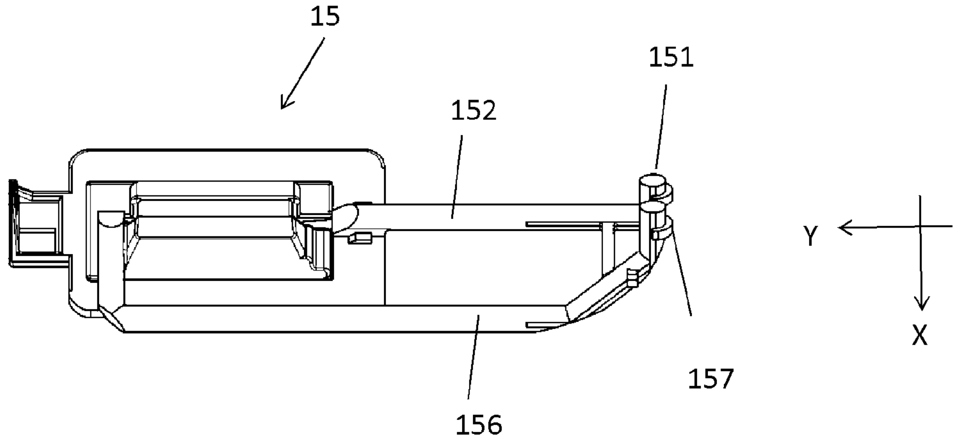
FIGS. 6A and 6B are diagrams illustrating the structure of the remaining amount detection unit in Example 1.
Figure 6B:
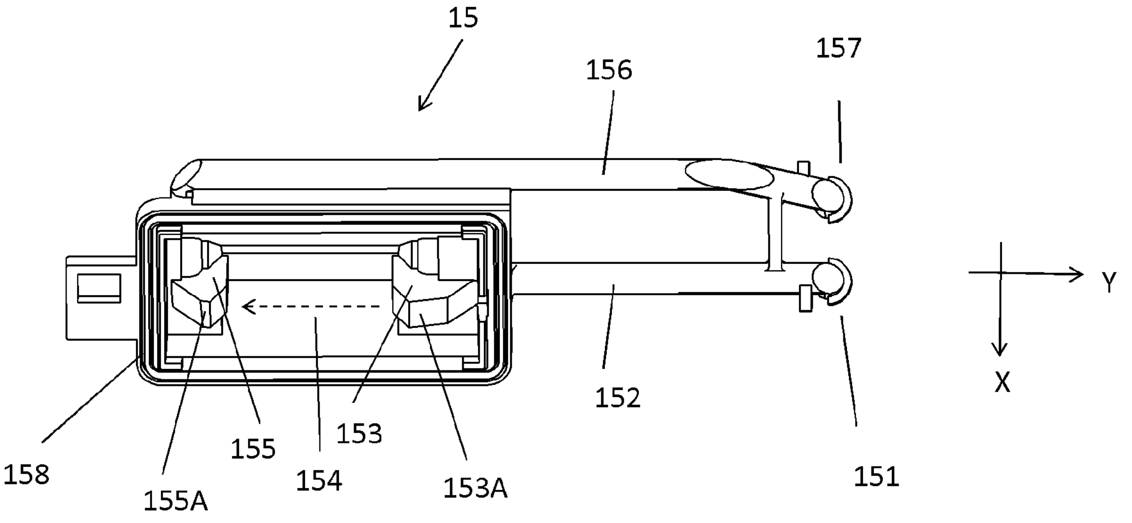

FIGS. 6A and 6B are diagrams illustrating the structure of the remaining amount detection unit 15. FIG. 6A illustrates a case where the remaining amount detection unit 15 is viewed from the outside of the accommodation chamber 8, and FIG. 6B illustrates a case where the remaining amount detection unit 15 is viewed from the inside of the accommodation chamber 8. The remaining amount detection unit 15 is formed of a material that transmits light having a predetermined wavelength used for detecting a remaining amount. An opening for attaching the remaining amount detection unit 15 is provided in the side downstream inner wall surface 25 (see FIGS. 7A to 7C) to which the remaining amount detection unit 15 is attached on the inner wall surface of the accommodation chamber 8, and an attachment portion 158 of the remaining amount detection unit 15 is fixed to the opening. Thus, a virtual surface including the outer edge of the attachment portion 158 is substantially flush with the side downstream inner wall surface 25 of the accommodation chamber 8 to which the remaining amount detection unit 15 is attached.

The remaining amount detection unit 15 includes an incidence portion 151 that introduces a predetermined amount of light into the accommodation chamber 8 and an emission portion 157 that emits light to the outside of the accommodation chamber 8. Light for detecting a remaining amount which is emitted from a light emitting member, which is not illustrated in the drawing, provided outside of the accommodation chamber 8 is incident on the incidence portion 151, is guided into the accommodation chamber 8 by a light guide portion 152, is emitted into the accommodation chamber 8 from a light emitting portion 153 in the accommodation chamber 8, and is incident on a light receiving portion 155 in the accommodation chamber 8. The light incident on the light receiving portion 155 is guided outside the accommodation chamber 8 by a light guide portion 156, is emitted from the emission portion 157, and is incident on a light receiving element, which is not illustrated in the drawing, provided outside the accommodation chamber 8. A light path 154 is formed between the light emitting portion 153 and the light receiving portion 155 in the accommodation chamber 8. A remaining amount of toner in the accommodation chamber 8 is detected by measuring light incident on the light receiving element.

Tip end portions 153A and 155A of the light emitting portion 153 and the light receiving portion 155 of the remaining amount detection unit 15, which are positioned on the innermost side of the accommodation chamber 8, are positioned on the inner side of the accommodation chamber 8 with respect to a virtual plane including the outer edge of the attachment portion 158. In other words, the tip end portions 153A and 155A of the light emitting portion 153 and the light receiving portion 155 protrude toward the inside of the accommodation chamber 8 from a plane obtained by virtually extending the side downstream inner wall surface 25 to the position of the attachment portion 158. Thus, a portion of the light path 154 is present further inside the accommodation chamber 8 than the virtual plane. The incidence portion 151, the light guide portion 152, the light emitting portion 153, the light receiving portion 155, the light guide portion 156, and the emission portion 157 are light transmitting members that constitute the remaining amount detection unit 15.

The amount of light emitted from the emission portion 157 being substantially equal to the amount of light incident from the incidence portion 151 indicates that the light path 154 is not blocked by the toner. Whereas, the amount of light emitted from the emission portion 157 being attenuated with respect to the amount of light incident from the incidence portion 151 indicates that a toner is provided in the light path 154.

Since a remaining amount of toner is large at the beginning of use of the developing device 4, the upper surface of a region including the toner is above the remaining amount detection unit 15 as indicated by symbol T in FIG. 3. Thus, the light path 154 of the remaining amount detection unit 15 keeps being covered with toner regardless of the rotational phase of the conveyance member 13. In this state, the amount of light emitted from the emission portion 157 hardly changes due to the rotational phase of the conveyance member 13.

Figure 7C:
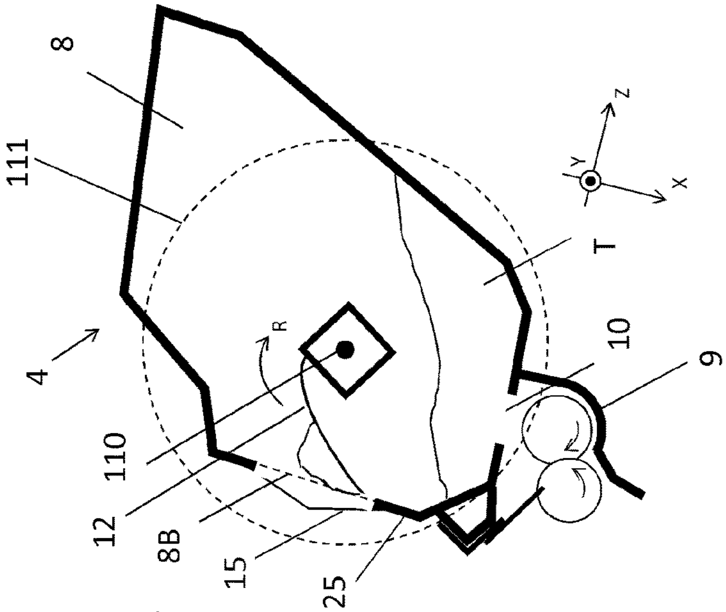
FIGS. 7A to 7C are diagrams illustrating the state of a toner that is conveyed inside an accommodation chamber in Example 1.
Figure 7B:
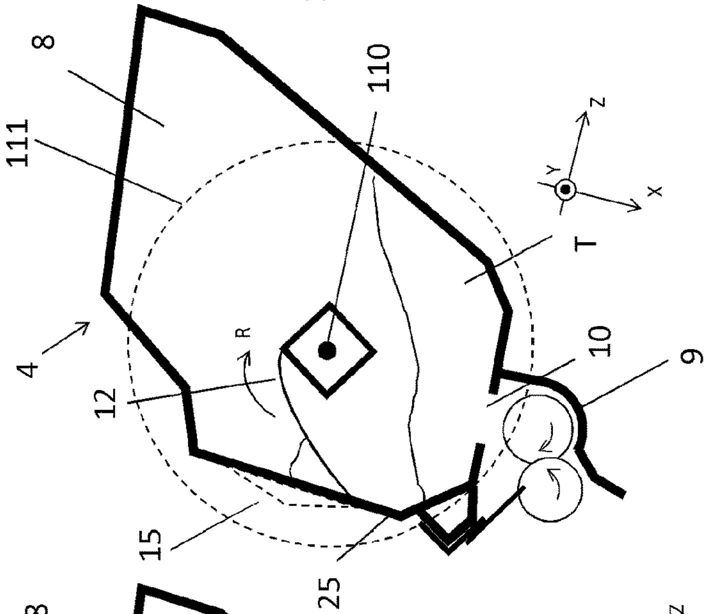
Figure 7A:
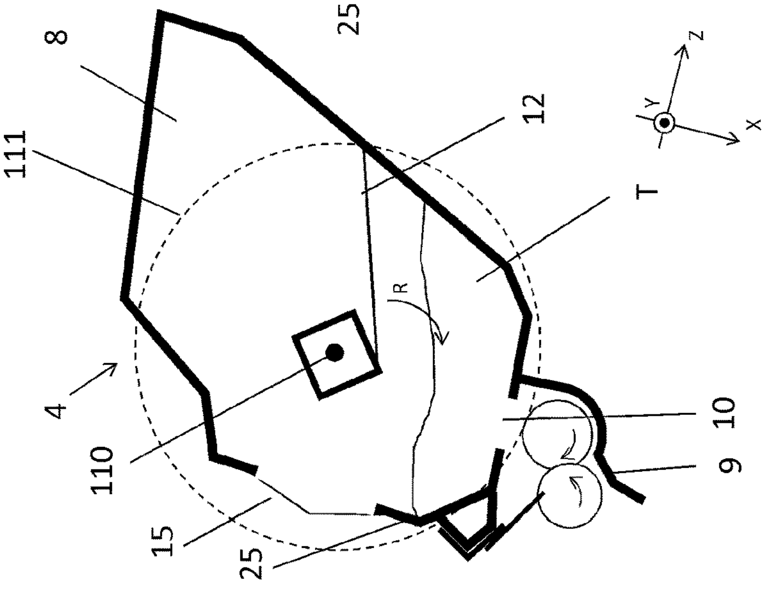

FIGS. 7A to 7C are diagrams illustrating the state of a toner conveyed by the conveyance member 13 in the accommodation chamber 8 in a state where a remaining amount of toner in the accommodation chamber 8 is reduced and an upper surface of a region including the toner is lower than the position of the remaining amount detection unit 15. FIGS. 7A to 7C illustrate the cross-section of the developing device in a state where a developing cartridge including the developing device is mounted on the apparatus main body of the image forming device 100. FIGS. 7A and 7C are cross-sectional views of the developing device 4 taken along a plane that is perpendicular to the Y direction and passes through the remaining amount detection unit 15, and FIG. 7B is a cross-sectional view of the developing device 4 taken along a plane that is perpendicular to the Y direction and does not pass through the remaining amount detection unit 15. FIG. 7A illustrates a state where the tip end portion of the sheet 12 of the conveyance member 13 has passed through the remaining amount detection unit 15 and then has reached the upper portion of the accommodation chamber 8. FIGS. 7B and 7C illustrate a state where the tip end portion of the sheet 12 passes through the side downstream inner wall surface 25 on which the remaining amount detection unit 15 is provided.

A state where a remaining amount of toner in the accommodation chamber 8 as illustrated in FIGS. 7A to 7C decreases is different from a state at the beginning of use as illustrated in FIG. 3, and a toner is not present in the light path 154 of the remaining amount detection unit 15 in a state where the toner cannot be conveyed to the remaining amount detection unit 15 by the conveyance member 13.

A distance from the rotation axis of the conveyance member 13 to the side downstream inner wall surface 25 of the accommodation chamber 8 provided with the remaining amount detection unit 15 is shorter than a length from the rotation axis of the conveyance member 13 to the tip end of the sheet 12 in an undeformed state. For this reason, when the tip end portion of the sheet 12 passes while abutting on the side downstream inner wall surface 25, the sheet 12 maintains a bent state. Due to the bending, in a region of the side downstream inner wall surface 25 where the remaining amount detection unit 15 is not provided, a toner can be held in a space formed by the tip end portion of the sheet 12 and the side downstream inner wall surface 25 of the accommodation chamber 8 as illustrated in FIG. 7B.

As illustrated in FIG. 7C, the remaining amount detection unit 15 is formed in a concave shape when viewed from the inside of the accommodation chamber 8. In other words, the remaining amount detection unit 15 protrudes toward the outside of the accommodation chamber 8 from the side downstream inner wall surface 25. For this reason, a distance from the rotation axis of the conveyance member 13 to the remaining amount detection unit 15 is larger than a distance from the rotation axis of the conveyance member 13 to the side downstream inner wall surface 25.

Here, since the sheet 12 is a continuous body formed of an elastic material and extending in the Y direction, the state of deformation of a portion of the sheet 12 is affected by the state of deformation of a portion adjacent to that portion in the Y direction. For example, the state of deformation of the sheet 12 in a region provided with the remaining amount detection unit 15 is affected by the state of deformation of the sheet 12 in a region not provided with the remaining amount detection unit 15 which is adjacent to both ends of that region in the Y direction.

In Example 1, the width of the remaining amount detection unit 15 in the Y direction (25 mm in Example 1, a length indicated by γ in FIG. 5) is smaller than the width of the communication port 10 in the Y direction (216 mm in Example 1). For this reason, the state of deformation of the sheet 12 in the region provided with the remaining amount detection unit 15 is substantially the same as the state of deformation of the sheet 12 in the region not provided with the remaining amount detection unit 15 which is adjacent to both ends of that region in the Y direction.

Although the tip end portion of the sheet 12 does not abut on the side downstream inner wall surface 25 in the region provided with the remaining amount detection unit 15, the state of deformation thereof is substantially the same as the state of deformation of the sheet 12 that abuts on the side downstream inner wall surface 25 in the region not provided with the remaining amount detection unit 15. In other words, when the shape of the sheet 12 in a portion that does not face the remaining amount detection unit 15 is determined, the shape of the sheet 12 in a portion facing the remaining amount detection unit 15 is also determined to be substantially the same shape.

Thus, the bending deformation of the sheet 12 is substantially the same between the region not provided with the remaining amount detection unit 15 as illustrated in FIG. 7B and the region provided with the remaining amount detection unit 15 as illustrated in FIG. 7C. For this reason, a toner held on the surface of the conveyance member 13 on the downstream side in the rotation direction passes through a portion of the light path 154 which protrudes toward the inside of the accommodation chamber 8 from a virtual plane including the outer edge of the attachment portion 158.

When a remaining amount of toner in the accommodation chamber 8 decreases, the toner conveyed by the sheet 12 of the conveyance member 13 passes through a portion of the light path 154 on the inner side of the accommodation chamber 8 with respect to the virtual plane including the outer edge of the attachment portion 158 when the sheet 12 passes through the remaining amount detection unit 15. A toner is not present in a portion of the light path 154 on the outer side of the accommodation chamber 8 with respect to the virtual plane. Thus, when a remaining amount of toner in the accommodation chamber 8 decreases, the amount of light emitted from the emission portion 157 changes depending on the rotation phase of the conveyance member 13. For this reason, this state can be easily determined to be a state where the toner at the beginning of use is full.

Note that it is preferable that the remaining amount detection unit 15 be disposed at a position near the connecting portion 14 or between the adjacent connecting portions 14. As described above, the connecting portion 14 functions as an abutting portion that abuts on the sheet 12 and maintains a bent state, and thus the sheet 12 is stably deformed in the vicinity of the connecting portion 14. With respect to a region between the adjacent connecting portions

14, the abutting portions are present at respective ends of the region in the Y direction, and hence the sheet 12 is stably deformed. Thus, the amount of toner held at the tip end portion of the sheet 12 is stable, and the amount of toner can be detected with high accuracy.

Effects of Example 1

Effects of Example 1 will be described. Note that various modifications can be made to Example 1. Hereinafter, the effects will be described using Example 1 and its four types of modification examples. Differences in configuration between Example 1 and the modification examples will be briefly described below. Other configuration of the modification examples are the same as Example 1.

Example 1: An oblique connecting portion is provided in the communication port.

First modification example: No connecting portion is provided in the communication port.

Second modification example: A vertical connecting portion is provided in the communication port.

Third modification example: A sheet does not contact the inner wall surface where the remaining amount detection unit is provided.

Fourth modification example: A sheet does not contact the bottom inner wall surface of the accommodation chamber.

Example 1

Figure 8:
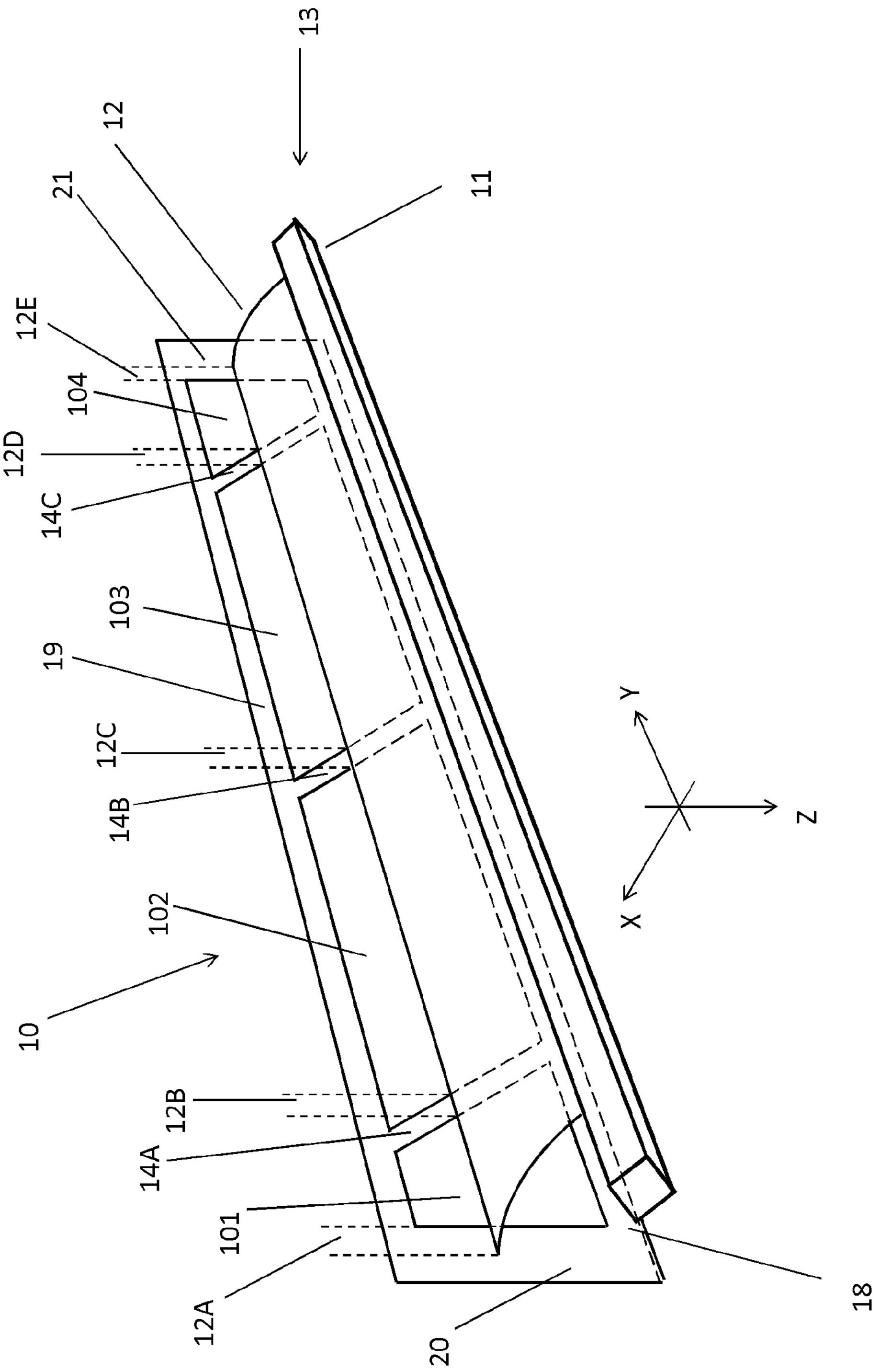
FIG. 8 is a diagram illustrating the state of a sheet that passes in front of the communication port in Example 1.

FIG. 8 is a diagram illustrating a state where the sheet 12 of the conveyance member 13 passes in front of the communication port 10 in Example 1. The width of the sheet 12 in the Y direction is 220 mm, the width of the communication port 10 in the Y direction is 216 mm, the tip end portion of the sheet 12 abuts on a portion of the third communication port end portion 20 which is close to the opening 101 with a width of 2 mm, the tip end portion of the sheet 12 abuts on a portion of the fourth communication port end portion 21 which is close to the opening 104 with a width of 2 mm, and the tip end portion of the sheet 12 is bent. In addition, portions of the tip end portion of the sheet 12 which abut on the connecting portions 14A, 14B, and 14C are similarly bent.

Thus, in the configuration of Example 1, the tip end portion of the sheet 12 is bent while abutting on the communication port 10 at five portions 12A, 12B, 12C, 12D, and 12E. A portion of the third communication port end portion 20 of the communication port 10 which is close to the opening 101, a portion of the fourth communication port end portion 21 which is close to the opening 104, and the connecting portions 14A, 14B, and 14C function as abutting portions that abut on the tip end portion of the sheet 12 and keep the sheet 12 bent.

The state of deformation of a portion of the tip end portion of the sheet 12 at the position of the opening 101 is specified by the state of deformation of the portions 12A and 12B that abut on abutting portions (the third communication port end portion and the connecting portion 14A) which are adjacent to both sides thereof in the Y direction. The same is true of portions located at the positions of the openings 102, 103 and 104.

In the case of Example 1, there are five abutting portions, and a distance between the abutting portions in the Y direction is shorter than the length of the sheet 12 in the Y direction. For this reason, regarding a portion of the tip end portion of the sheet 12 which is positioned at any of the openings 101, 102 103, and 104, the state of bending deformation is substantially the same as the state of bending deformation of the portions 12A, 12B, 12C, 12D, and 12E abutting on the abutting portions. Thus, when the sheet 12 passes in front of the communication port 10, the bending shape of the sheet 12 becomes uniform in the Y direction. In Example 1, as illustrated in FIG. 4, the remaining amount detection unit 15 is positioned corresponding to the opening 102 in the Y direction, but the state of deformation of a portion of the tip end portion of the sheet 12 at the position of the opening 102 is the same as the state of deformation of a portion abutting on the abutting portion.

Figure 1C:
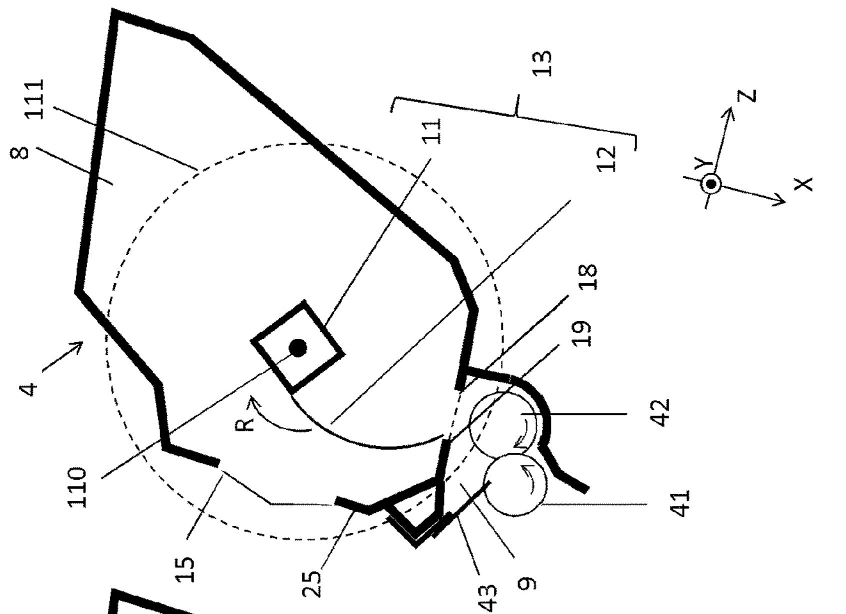
FIGS. 1A to 1C are diagrams illustrating a state where a sheet in Example 1 bends when passing in front of a communication port.
Figure 1B:
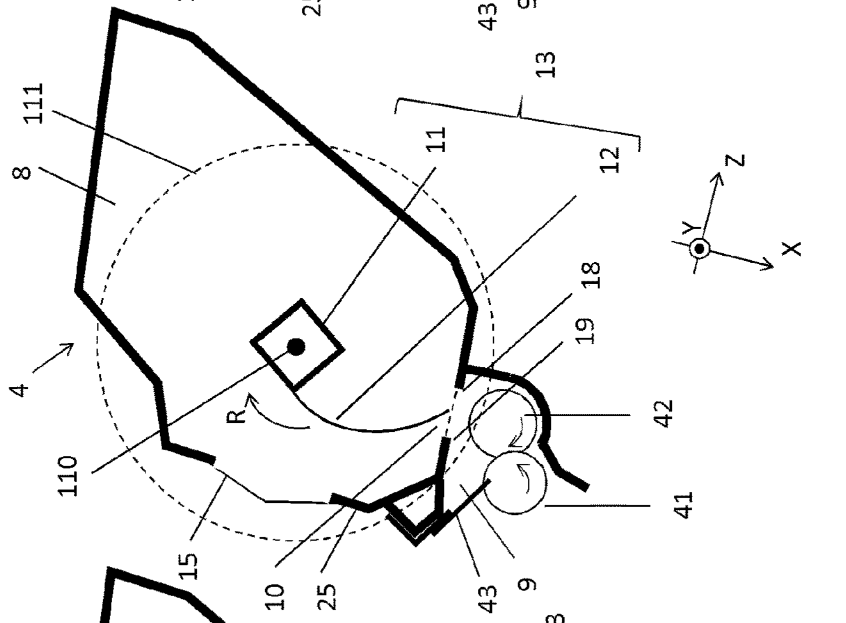
Figure 1A:
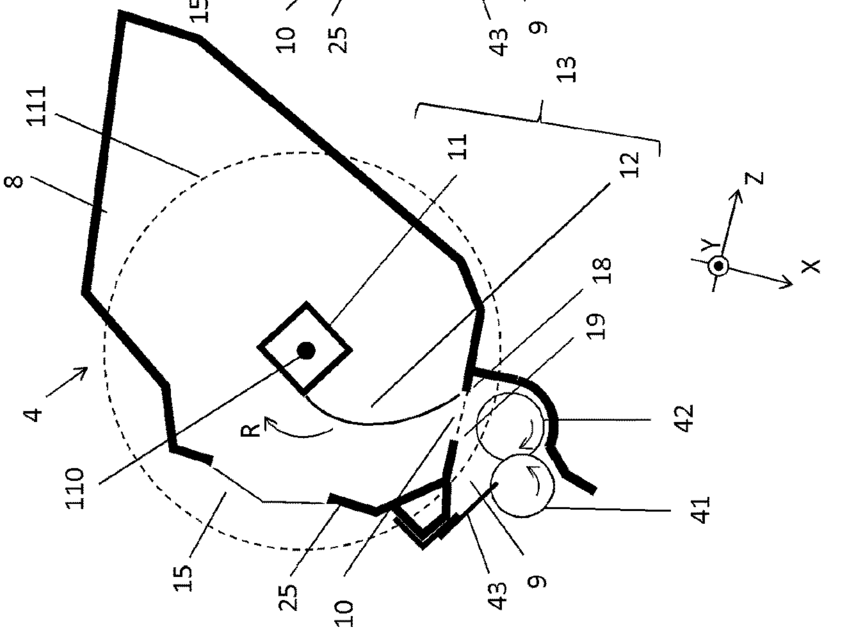

FIGS. 1A to 1C are diagrams illustrating a state where the sheet 12 bends when passing in front of the communication port 10. FIGS. 1A to 1C illustrate the cross-section of the developing device 4 taken along a plane that is perpendicular to the Y direction and passes through the remaining amount detection unit 15.

FIG. 1A illustrates a state immediately after the sheet 12 has passed through the first communication port end portion 18 of the communication port 10. FIG. 1B illustrates a state where the sheet 12 is passing in front of the communication port 10. FIG. 1C illustrates a state immediately after the sheet 12 has passed through the second communication port end portion 19 of the communication port 10. At any point in time, the tip end portion of the sheet 12 is bent while abutting on the five abutting portions (a portion of the third communication port end portion 20 which is close to the opening 101, a portion of the fourth communication port end portion 21 which is close to the opening 104, and the connecting portions 14A; 14B, 14C). For this reason, as described in FIG. 8, the sheet 12 is maintained in a uniformly bent state in the Y direction.

Thus, the sheet 12 is maintained in a uniformly bent state in the Y direction until the sheet 12 passes in front of the communication port 10 on the inner wall surface of the accommodation chamber 8 including the location where the communication port 10 is provided, and reaches the remaining amount detection unit 15, and the sheet 12 has a small change in the bent state. Thus, a toner held at a position corresponding to the remaining amount detection unit 15 in the tip end portion of the sheet 12 is conveyed to the remaining amount detection unit 15 in a stable state.

First Modification Example

Figure 9:
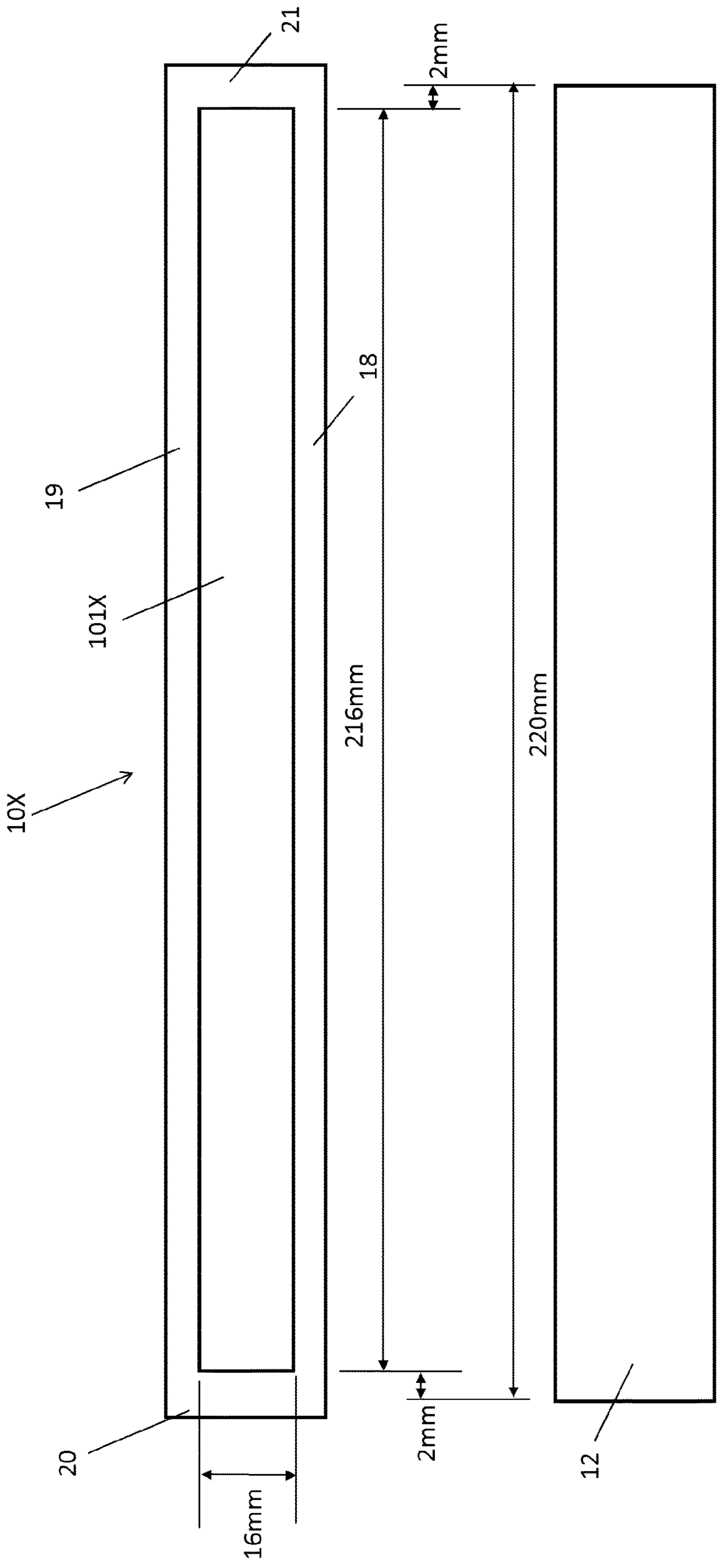
FIG. 9 is a diagram illustrating a configuration of a communication port and a positional relationship with a sheet in a first modification example.

FIG. 9 is a diagram illustrating a configuration of a communication port 10X and a positional relationship with the sheet 12 in a first modification example. The first modification example differs from Example 1 in that there is no oblique connecting portion 14 between a third communication port end portion 20 of the communication port 10X and the fourth communication port end portion 21. Other configurations are the same as those in Example 1.

Figure 10:
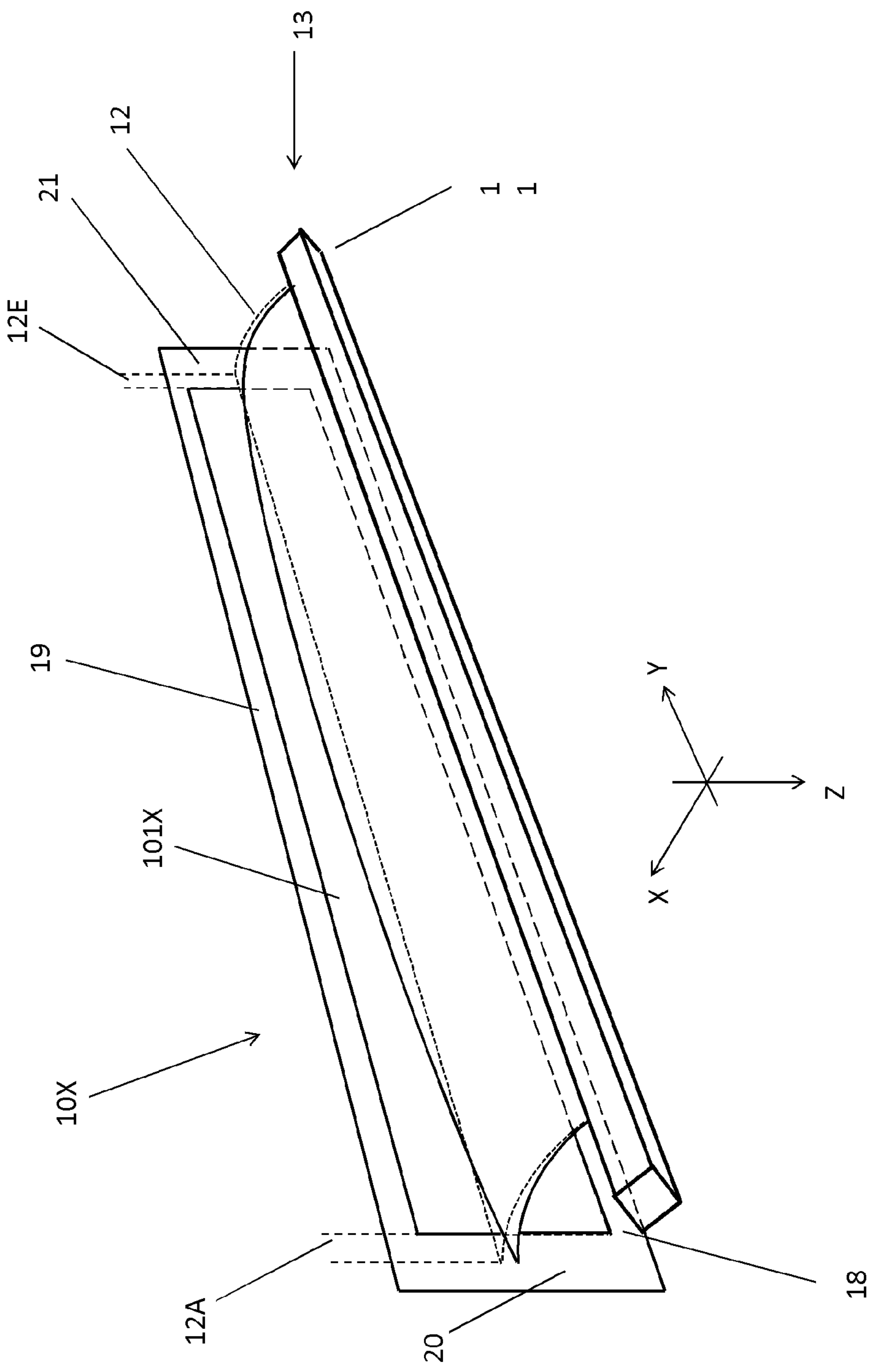
FIG. 10 is a diagram illustrating the state of a sheet that passes in front of the communication port in the first modification example.

FIG. 10 is a diagram illustrating a state where the sheet 12 of the conveyance member 13 passes in front of the communication port 10X in the first modification example. Since there is no connecting portion 14, the communication port 10 is not divided in the Y direction, and has one opening 101X extending in the Y direction over the region where the communication port 10 is provided. As in Example 1, the width of the sheet 12 in the Y direction is 220 mm, the width of the communication port 10X in the Y direction is 216 mm, the tip end portion of the sheet 12 abut on a portion of the third communication port end portion 20 which is close to the opening 101X with a width of 2 mm, the tip end portion of the sheet 12 abut on a portion of the fourth communication port end portion 21 which is close to the opening 101X with a width of 2 mm, and the tip end portion of the sheet 12 is bent.

Unlike Example 1, since there is no connecting portion 14 in the first modification example, the tip end portion of the sheet 12 is bent while abutting on the communication port 10X at two portions 12A and 12E. The portion of the third communication port end portion 20 of the communication port 10X which is close to the opening 101X and the portion of the fourth communication port end portion 21 which is close to the opening 101X function as abutting portions that maintain the bent state of the sheet 12 while abutting on the tip end portion of the sheet 12.

The state of deformation of the portion of the tip end portion of the sheet 12 at the position of the opening 101X is specified by the state of deformation of the portions 12A and 12E abutting on the abutting portions (the third communication port end portion 20 and the fourth communication port end portion 21) adjacent to both sides thereof in the Y direction.

In the first modification example, there are two abutting portions at both ends in the Y direction, and a distance between the abutting portions in the Y direction is close to the length of the sheet 12 in the Y direction. For this reason, the abutting portions (the third communication port end portion 20 and the fourth communication port end portion 21) has a weak effect of regulating bending deformation of the portion of the sheet 12 at the position of the opening 101X. Thus, the state of bending deformation of the portion of the sheet 12 at the position of the opening 101X is not the same as the state of bending deformation of the portions 12A and 12E abutting on the abutting portions. In FIG. 10, the sheet 12 indicated by a solid line shows the state of deformation in the first modification example, and the sheet 12 indicated by a dashed line shows the state of deformation in Example 1 in an overlapping manner for comparison. In the case of the first modification example, a portion of the sheet 12 at the position of the opening 101X is bent and deformed in a state where the central portion thereof in the Y direction is convex in the X direction, and may partially enter the developing chamber 9.

Figure 11C:
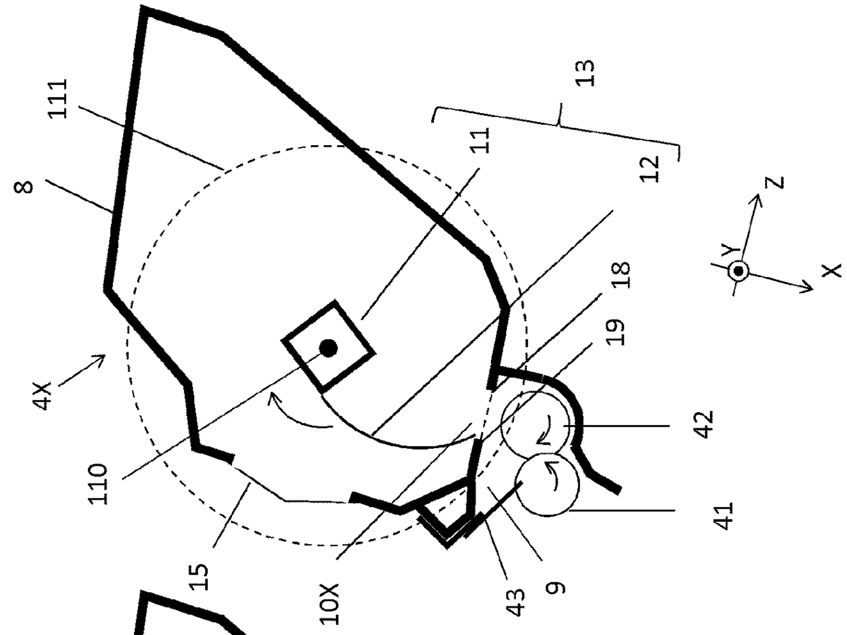
FIGS. 11A to 11C are diagrams illustrating a state where a sheet in the first modification example bends when passing in front of the communication port.
Figure 11B:
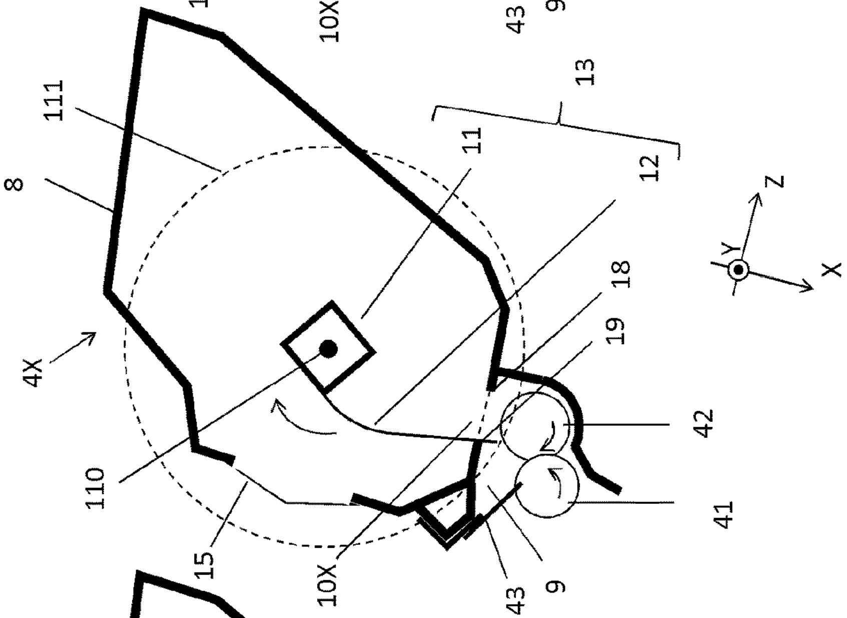
Figure 11A:
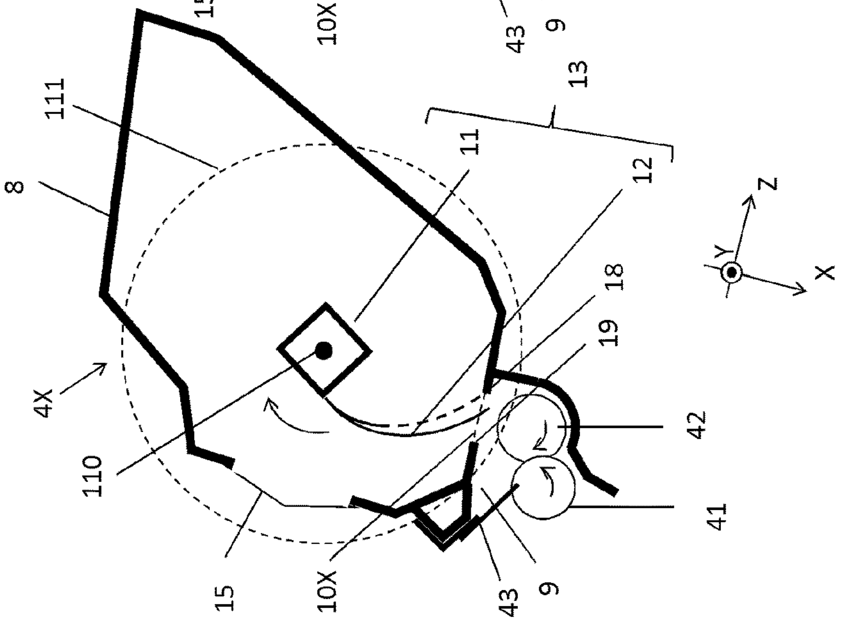

FIGS. 11A to 11C are diagrams illustrating a state where the sheet 12 in the first modification example is bent when passing in front of the communication port FIGS. 11A to 11C illustrate the cross-section of the developing device in a state where the developing cartridge including the developing device is mounted on the apparatus main body of the image forming device 100. FIGS. 11A to 11C illustrate the cross-section of a developing device 4X in the first modification example which is taken along a plane that is perpendicular to the Y direction and passes through the remaining amount detection unit 15.

FIG. 11A illustrates a state immediately after the sheet 12 passes through the first communication port end portion 18 of the communication port 10X. The sheet 12 indicated by a dashed line in FIG. 11A shows a state immediately before the sheet 12 passes through the first communication port end portion 18 in an overlapping manner for comparison.

Comparing Example 1 and the first modification example, a portion of the tip end portion of the sheet 12 of which the position in the Y direction corresponds to the position of the remaining amount detection unit 15 passes through the first communication port end portion 18, and then passes in front of the opening 102 in Example 1 and passes in front of the opening 101X in the first modification example. That is, it passes in front of the opening in both Example 1 and the first modification example. Before and after the sheet 12 passes through the first communication port end portion 18, the tip end portion of the sheet 12 changes from a state where it is bent while abutting on the inner wall surface of the bottom of the accommodation chamber 8 to a state where there is no counterpart member to be abutted in both Example 1 and the first modification example.

In Example 1, while the sheet 12 passes in front of the communication port 10, a portion of the tip end portion of the sheet 12 that does not abut on any counterpart member is positioned in the Y direction so as to be close to a portion that abuts on a counterpart member (the third communication port end portion 20 and the connecting portion 14A). For this reason, the portion of the tip end portion of the sheet 12 that does not abut on any counterpart member is bent and deformed in the same state as the portion that abuts on a counterpart member. For this reason, the bending shape of a portion of the tip end portion of the sheet 12 of which the position in the Y direction corresponds to the position of the remaining amount detection unit 15 hardly changes before and after the sheet 12 passes through the first communication port end portion 18.

In the first modification example, while the sheet 12 passes in front of the communication port 10, a portion of the tip end portion of the sheet 12 which does not abut on any counterpart member is positioned in the Y direction so as to be far from a portion that abuts on a counterpart member (the third communication port end portion 20 and the fourth communication port end portion 21). For this reason, the portion of the tip end portion of the sheet 12 which does not abut on any counterpart member is deformed in a state different from the portion that abuts on a counterpart member. For this reason, the bending shape of the portion of the tip end portion of the sheet 12 of which the position in the Y direction corresponds to the position of the remaining amount detection unit 15 changes from a state indicated by a dashed line to a state indicated by a solid line before and after the sheet 12 passes through the first communication port end portion 18.

FIG. 11B illustrates a state where the sheet 12 has been rotated further from the position illustrated in FIG. 11A and has come into contact with the second communication port end portion 19. A portion of the tip end portion of the sheet 12 of which the position in the Y direction corresponds to the position of the remaining amount detection unit 15 is bent and deformed into a shape that is convex toward the developing chamber 9, the surface of the conveyance member 13 on the downstream side in the rotation direction collides with the second communication port end portion 19.

FIG. 11C illustrates a state immediately after the sheet 12 has passed in front of the communication port 10X. The tip end portion, which extends in the Y direction, of the sheet 12 is uniformly bent while abutting on the inner wall surface of the bottom of the accommodation chamber 8. The state of the bending deformation of the sheet 12 in the state of FIG. 11C is the same as the state in Example 1 illustrated in FIG. 1C.

In the first modification example, a toner held at a position of the tip end portion of the sheet 12 which corresponds to the position of the remaining amount detection unit 15 is scraped off by the second communication port end portion 19 when the state illustrated in FIG. 11B changes to the state illustrated in FIG. 11C. In Example 1, the toner held at the tip end portion of the sheet 12 is less likely to be scraped off when passing through the second communication port end portion 19. Thus, compared to Example 1, in the first modification example, even when a remaining amount of toner in the accommodation chamber 8 is the same, the amount of toner passing through the remaining amount detection unit 15 is reduced. Thus, a remaining amount of toner can be detected more accurately in Example 1 than in the first modification example.

Second Modification Example

Figure 12:
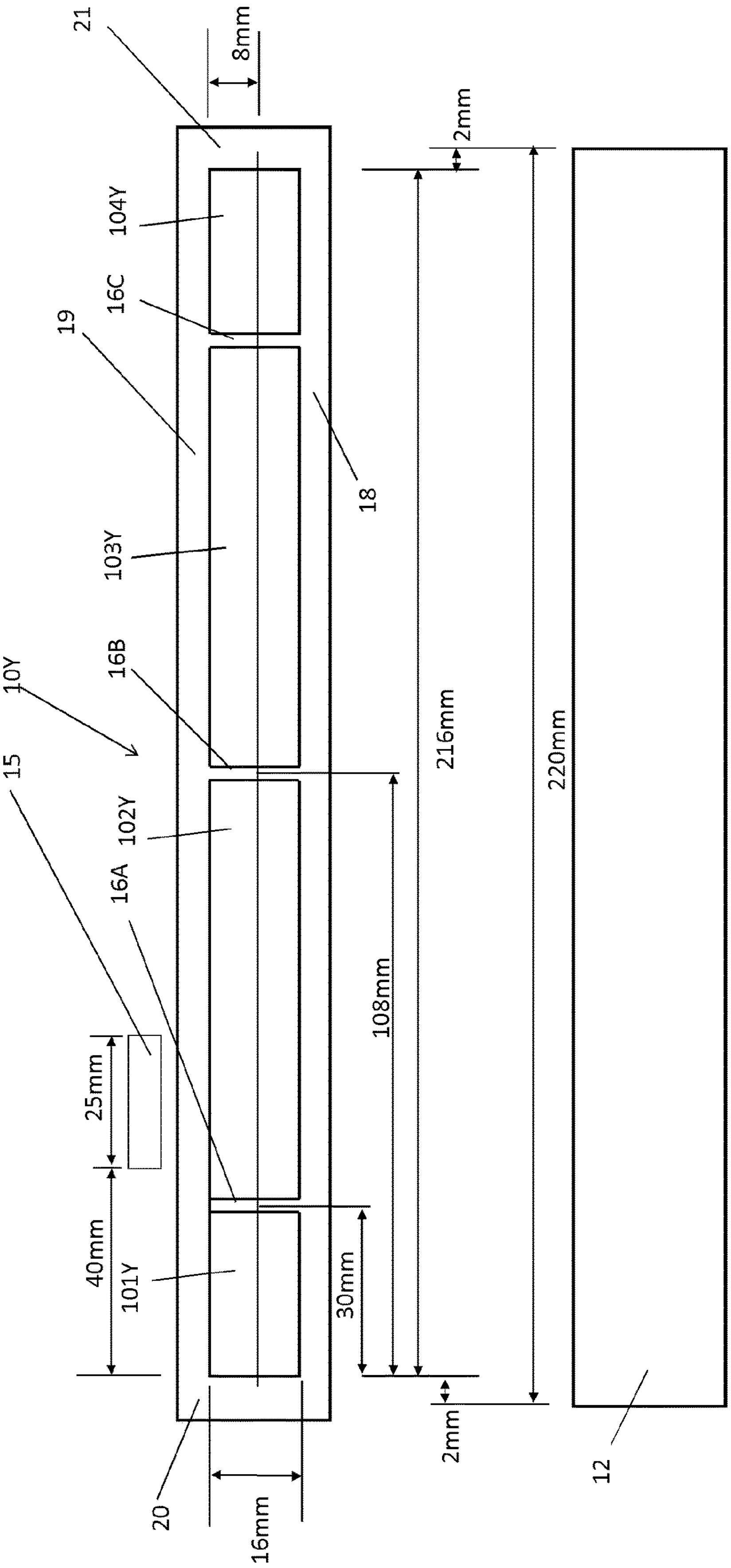
FIG. 12 is a diagram illustrating a configuration of a communication port in the second modification example and a positional relationship between a remaining amount detection unit and a sheet.

FIG. 12 is a diagram illustrating a configuration of a communication port 10Y and a positional relationship between the remaining amount detection unit 15 and the sheet 12 in a second modification example. The second modification example differs from Example 1 in that a plurality of vertical connecting portions 16 are provided between the third communication port end portion 20 and the fourth communication port end portion 21 in the second modification example while oblique connecting portions are provided in Example 1. The other configurations are the same as in Example 1.

In the second modification example, three connecting portions 16 (16A, 16B, and 16C from a side closer to the third communication port end portion 20) are provided in the Y direction. Thus, an opening of a communication port 10Y is divided into four openings (101Y, 102Y, 103Y, and 104Y from a side closer to the third communication port end portion 20).

In the second modification example, as in Example 1, the tip end portion of the sheet 12 is bent while abutting on five portions (a portion of the third communication port end portion 20 which is close to the opening 101, a portion of the fourth communication port end portion 21 which is close to the opening 104, and connecting portions 16A, 16B, and 16C) when passing in front of the communication port 10Y. These five portions function as abutting portions that abut on the tip end portion of the sheet 12 and maintain the bent state of the sheet 12.

In the second modification example, as in Example 1, a portion of the tip end portion of the sheet 12 of which the position in the Y direction corresponds to the position of the remaining amount detection unit 15 passes through the first communication port end portion 18, and then passes in front of an opening 102X. In other words, as in Example 1, before and after the sheet 12 passes through the first communication port end portion 18, a state where the tip end portion of the sheet 12 is bent while abutting on the inner wall surface of the bottom of the accommodation chamber 8 changes to a state where there is no counterpart member to be abutted.

In the second modification example, as in Example 1, while the sheet 12 passes in front of the communication port 10X, a portion of the tip end portion of the sheet 12 that does not abut on any counterpart member is positioned in the Y direction so as to be close to a portion that abuts on a counterpart member (the third communication port end portion 20 and the connecting portion 16A). For this reason, the portion of the tip end portion of the sheet 12 that does not abut on any counterpart member is bent and deformed in the same state as the portion that abuts on a counterpart member, and the bending shape of a portion of the tip end portion of the sheet 12 of which the position in the Y direction corresponds to the position of the remaining amount detection unit 15 hardly changes before and after the sheet 12 passes through the first communication port end portion 18. Thus, as in Example 1, the toner held in the portion of the tip end portion of the sheet 12 which corresponds to the remaining amount detection unit 15 is conveyed to the remaining amount detection unit 15 in a stable state, and a remaining amount of toner can be detected with the same accuracy as in Example 1.

Whereas, from the viewpoint of supplying a developer to the developing chamber 9, in the configuration of the second modification example, while the sheet 12 is passing in front of the communication port 10Y, a specific portion of the tip end portion of the sheet 12 in the Y direction keeps facing the connecting portion 16. For this reason, the connecting portion 16 acts like a wall on a toner supply path.

For this reason, the amount of toner supplied by the portions passing in front of the connecting portions 16A to 16C is smaller than the amount of toner supplied by the portions passing in front of the openings 101Y to 104Y. In a case where high-quality printed images that use a relatively large amount of toner to be stably supplied are consecutively printed, or the like, density unevenness in which image density becomes low in the portions corresponding to the connecting portions 16A to 16C in the Y direction may occur.

In this respect, in Example 1, the connecting portion 14 is oblique (angle $\alpha$=60 degrees in Example 1) with respect to the first communication port end portion 18 and the second communication port end portion 19, and thus there is no specific portion in the Y direction that keeps facing the connecting portion 14 while the sheet 12 is passing in front of the communication port 10. For this reason, there is no non-uniformity in the Y direction with respect to stableness in supplying a toner, and density unevenness does not occur even when high-quality printed images are consecutively printed. Thus, a toner can be supplied more stably in Example 1 than in the second modification example.

From the above, the angle $\alpha$ of the connecting portion 14 may be smaller than degrees. Note that, when the angle $\alpha$ is large, it becomes substantially the same state as a wall depending on the width of the connecting portion, and when the angle $\alpha$ is small, the influence of the connecting portion becomes wide in the Y direction, and thus the angle $\alpha$ is preferably in the range of 45° to 75°.

Third Modification Example

Figure 13B:
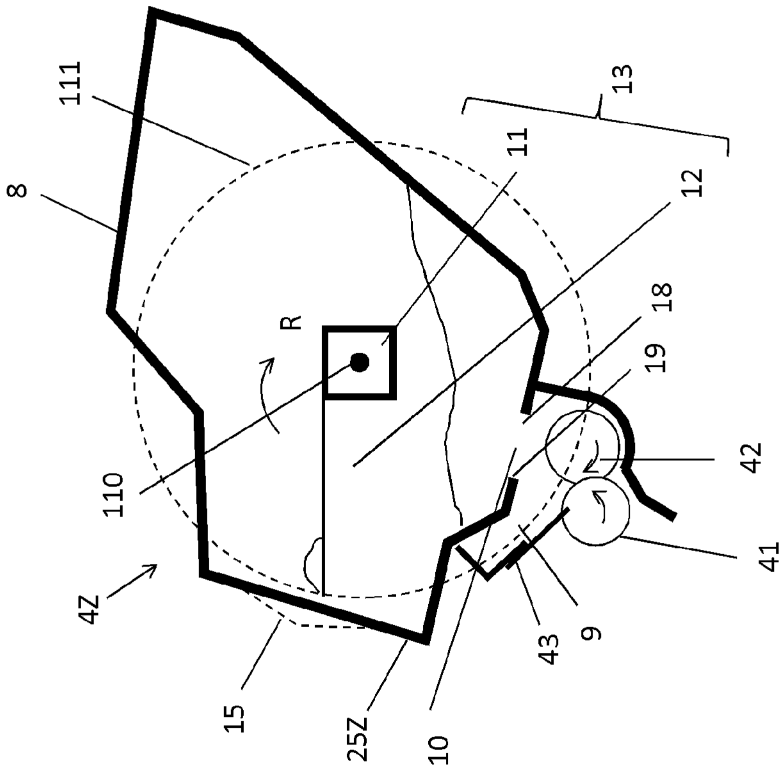
FIGS. 13A and 13B are diagrams illustrating the state of a sheet in the vicinity of a remaining amount detection unit in a third modification example.
Figure 13A:
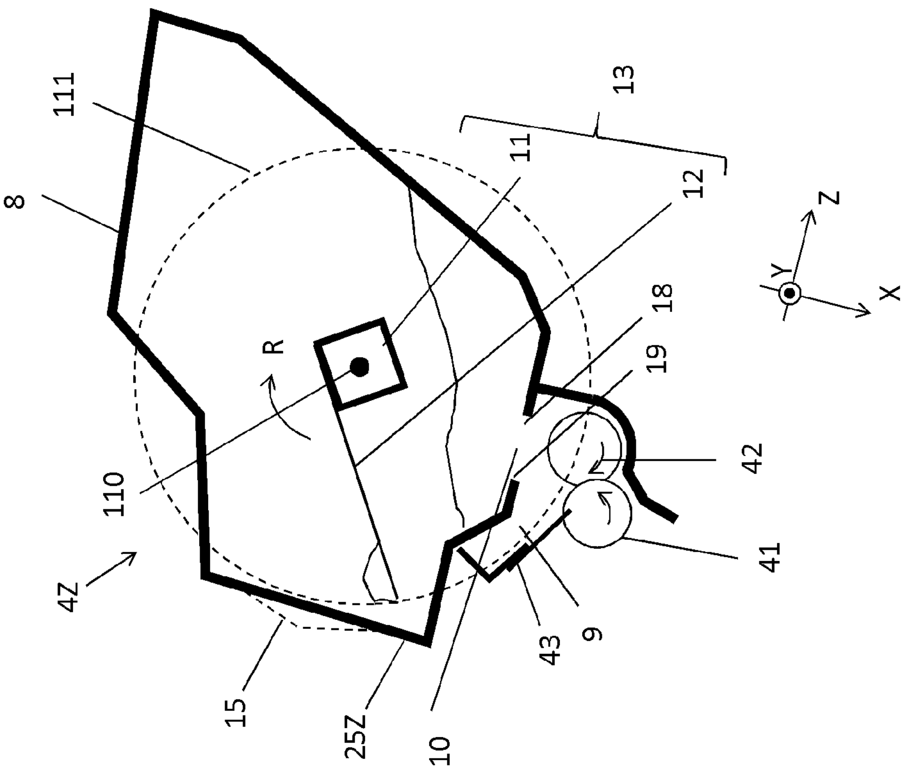

FIGS. 13A and 13B are diagrams illustrating a developing device 4Z in a third modification example. FIGS. 13A and 13B illustrate the cross-section of the developing device in a state where a developing cartridge including the developing device is mounted on the apparatus main body of the image forming device 100. FIGS. 13A and 13B illustrate the cross-section of the developing device 4Z in the third modification example which is taken along a plane that is perpendicular to the Y direction and does not pass through the remaining amount detection unit 15.

The third modification example differs from Example 1 in that there is no contact between a side downstream inner wall surface 25Z on which the remaining amount detection unit 15 is mounted and the sheet 12 after the sheet 12 passes in front of the communication port 10, and the sheet 12 is not bent. The other configurations are the same as those in Example 1.

FIG. 13A is a diagram illustrating a state immediately after the sheet 12 in the third modification example has passed through the second communication port end portion 19 of the communication port 10. FIG. 13B is a diagram illustrating a state after the sheet 12 has reached the remaining amount detection unit 15. FIGS. 13A and 13B illustrate the cross-section of the developing device 4Z taken along a plane that is perpendicular to the Y direction and does not pass through the remaining amount detection unit 15.

While the sheet 12 is passing in front of the communication port 10, the sheet 12 is bent and deformed while abutting on the third communication port end portion 20, the fourth communication port end portion 21, and the connecting portion 14 of the communication port 10 as in Example 1, and holds a toner on a surface (front surface) on the downstream side in the rotation direction.

In Example 1, after the sheet 12 passes in front of the communication port 10, the tip end portion of the sheet 12 is bent while abutting on the side downstream inner wall surface 25 provided with the remaining amount detection unit 15, and a toner is held in a space formed by the side downstream inner wall surface 25 and the front surface of the sheet 12 (FIG. 7B). Since the state of bending deformation of the sheet 12 is maintained until the sheet 12 reaches the remaining amount detection unit 15, the toner can be stably held to the remaining amount detection unit 15.

Whereas, in the third modification example, after the sheet 12 passes in front of the communication port 10, the tip end portion of the sheet 12 does not abut on the side downstream inner wall surface 25Z provided with the remaining amount detection unit as illustrated in FIG. 13A. In other words, the side downstream inner wall surface is positioned outside a virtual circle 111 having the rotation radius of the sheet 12 as a radius around the rotation axis 110 of the rotation shaft 11. For this reason, a space for holding the toner is not formed between the side downstream inner wall surface 25Z and the sheet 12, and the toner is held by the tip end portion of the sheet 12 in an unbent state, whereby the stability of holding of the toner is lower than in Example 1. Thus, in the third modification example, the toner held at the tip end portion of the sheet 12 before passing in front of the communication port 10 may drop from the sheet 12 after passing in front of the communication port 10. Thus, in the third modification example, compared to Example 1, there is a possibility that the amount of toner passing through the remaining amount detection unit 15 will decrease, and the amount of toner will vary depending on rotation cycle of the sheet 12 even when a remaining amount of toner in the accommodation chamber 8 is the same. Thus, a remaining amount of toner can be detected more accurately in Example 1 than in the third modification example.

Fourth Modification Example

Figure 14B:
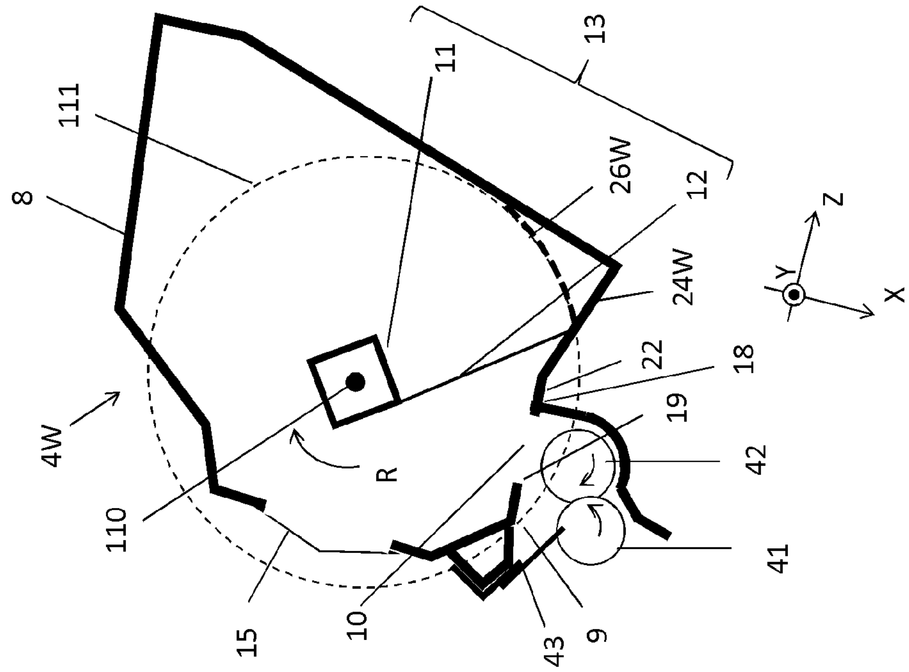
FIGS. 14A and 14B are diagrams illustrating the state of a sheet positioned upstream of a communication port in a fourth modification example.
Figure 14A:
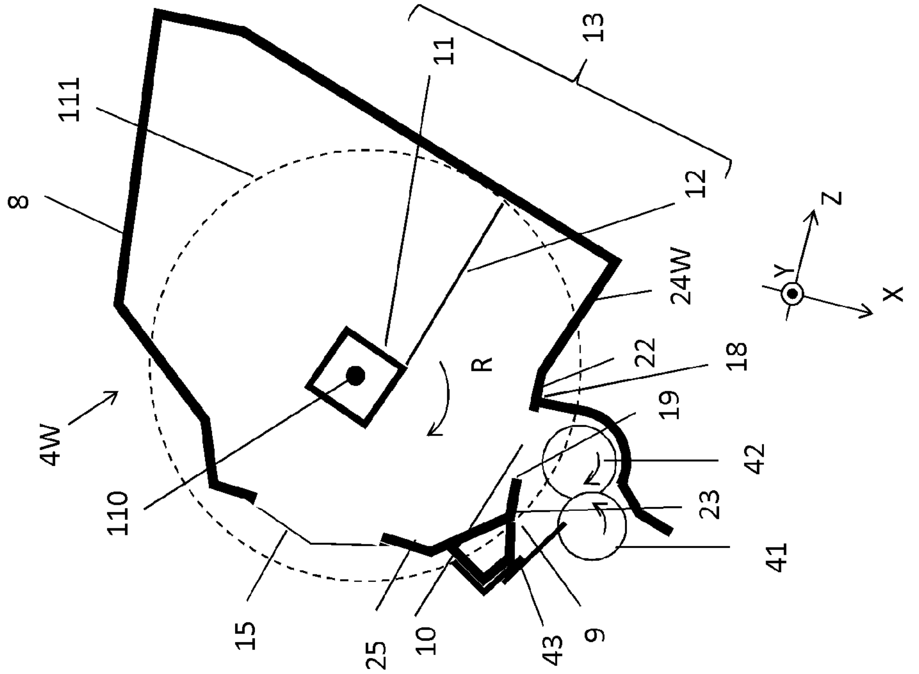

FIGS. 14A and 14B are diagrams illustrating a developing device 4W in a fourth modification example. FIGS. 14A and 14B illustrate the cross-section of the developing device in a state where a developing cartridge including the developing device is mounted on the apparatus main body of the image forming device 100. FIGS. 14A and 14B illustrates the cross-section of the developing device 4W in the fourth modification example which is taken along a plane that is perpendicular to the Y direction and passes through the remaining amount detection unit 15.

The fourth modification example differs from Example 1 in that there is a location where the tip end portion of the sheet 12 does not abut on the inner wall surface of the accommodation chamber 8 on an upstream side of the first communication port end portion 18 of the communication port 10 in the rotation direction R of the conveyance member 13. The other configurations are the same as those in Example 1.

FIG. 14A illustrates a state before the sheet 12 passes in front of the communication port 10, that is, a state where the sheet 12 is positioned upstream of the first communication port end portion 18 in the rotation direction (R direction). FIG. 14B illustrates a state where the sheet 12 rotates in the R direction from the position illustrated in FIG. 14A, and the sheet 12 is positioned upstream of the first communication port end portion 18 in the rotation direction (R direction).

A dashed line 26W in FIG. 14B indicates a trajectory along which the tip end of the sheet 12 passes during a period from the state of FIG. 14A to the state of FIG. 14B. The trajectory 26W is a portion of the virtual circle 111 having the rotation radius of the sheet 12 as a radius around the rotation axis 110 of the rotation shaft 11. As illustrated in FIG. 14B, there is the bottom upstream inner wall surface 22 on an upstream side of the first communication port end portion 18 of the communication port 10 in the rotation direction R on the bottom inner wall surface of the accommodation chamber 8. An inner wall surface 24W on which the tip end portion of the sheet 12 does not abut is positioned on the upstream side of the bottom upstream inner wall surface 22 in the rotation direction R. In other words, the inner wall surface 24W is positioned outside the virtual circle 111. The tip end portion of the sheet 12 does not abut on the inner wall surface 24W of the accommodation chamber 8 in a period from the state of FIG. 14A to the state of FIG. 14B, and the bending on the upstream side of the trajectory 26W is released. For this reason, the sheet 12 does not come into contact with a toner in a region (a region outside the virtual circle 111) closer to the inner wall surface 24W than the trajectory 26W of the tip end of the sheet 12, and the sheet 12 cannot convey the toner in the region to the communication port 10.

Whereas, as described with reference to FIG. 3, in Example 1, the tip end portion of the sheet 12 abuts from the side upstream inner wall surface 24 to the bottom upstream inner wall surface 22 and is maintained in a bent and deformed state. In other words, the side upstream inner wall surface 24 and the bottom upstream inner wall surface 22 are positioned inside the virtual circle 111. Further, the sheet 12 is maintained in a bent and deformed state while abutting on the inner wall surface until the sheet 12 reaches the remaining amount detection unit 15 of the side downstream inner wall surface 25 through the communication port 10 and the bottom downstream inner wall surface 23. Thus, a toner can be stably conveyed to the remaining amount detection unit 15, and the toner in the accommodation chamber 8 can be stably supplied to the developing chamber 9. Accordingly, it is possible to detect a remaining amount of toner more accurately in Example 1 than in the fourth modification example and to more stably supply the toner to the developing chamber 9.

Example 2

Figure 15:
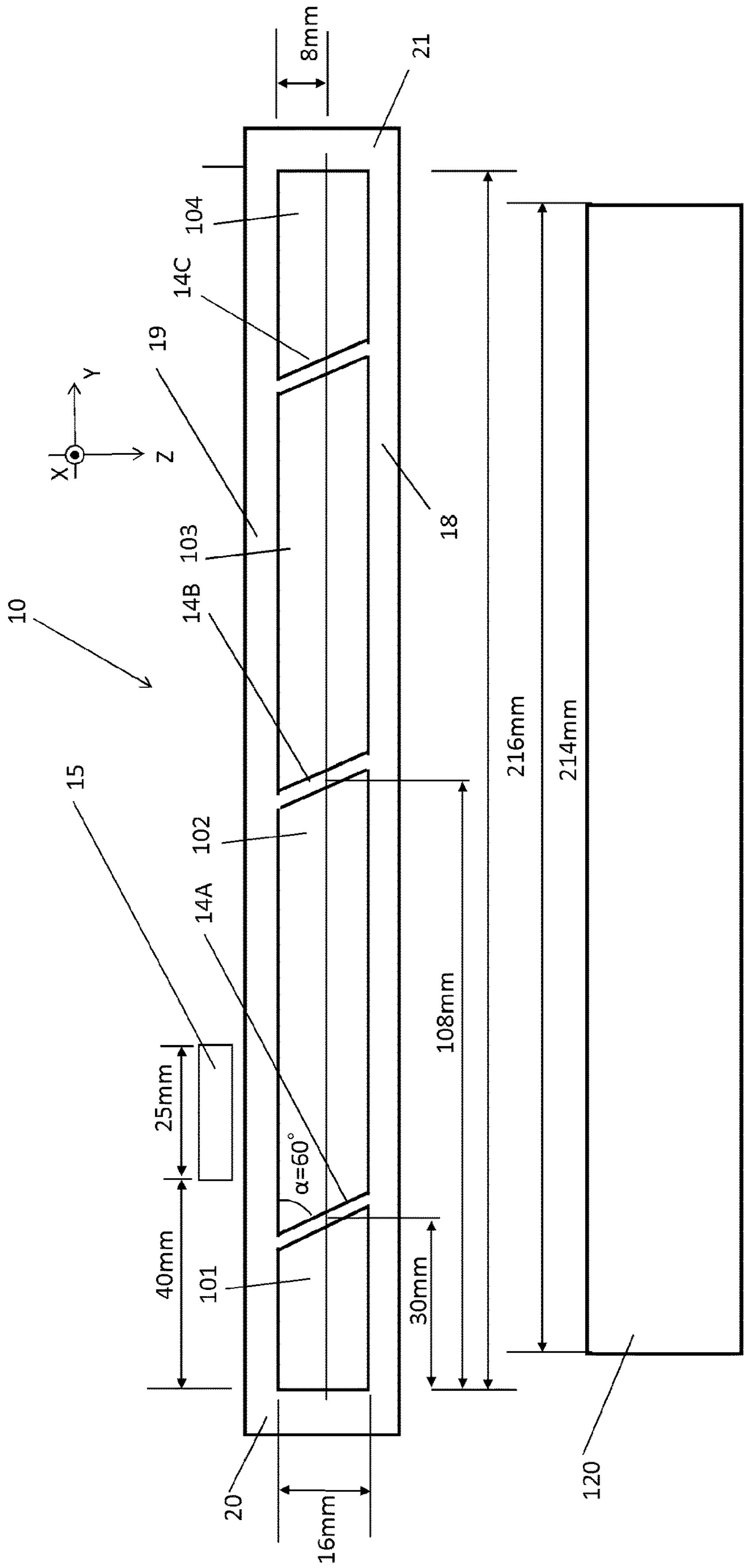
FIG. 15 is a diagram illustrating a configuration of the communication port and a positional relationship between the remaining amount detection unit and the sheet in Example 2.

FIG. 15 is a diagram illustrating a configuration of the communication port 10 and a positional relationship between the remaining amount detection unit 15 and a sheet 120 in Example 2. Example 2 differs from Example 1 in that the width of the sheet 120 in the Y direction is smaller than a distance between the third communication port end portion 20 and the fourth communication port end portion 21 of the communication port 10 in the Y direction (the width of the opening of the communication port 10 in the Y direction). The other configurations are the same as those in Example 1.

Specifically, the length of the sheet 120 in the Y direction in Example 2 was 214 mm, and a distance in the Y direction between the third communication port end portion 20 and the fourth communication port end portion 21 of the communication port 10 is 220 mm. For this reason, in Example 2, both ends of the tip end portion of the sheet 120 in the Y direction do not abut on the third communication port end portion 20 and the fourth communication port end portion 21 of the communication port 10.

Figure 16:
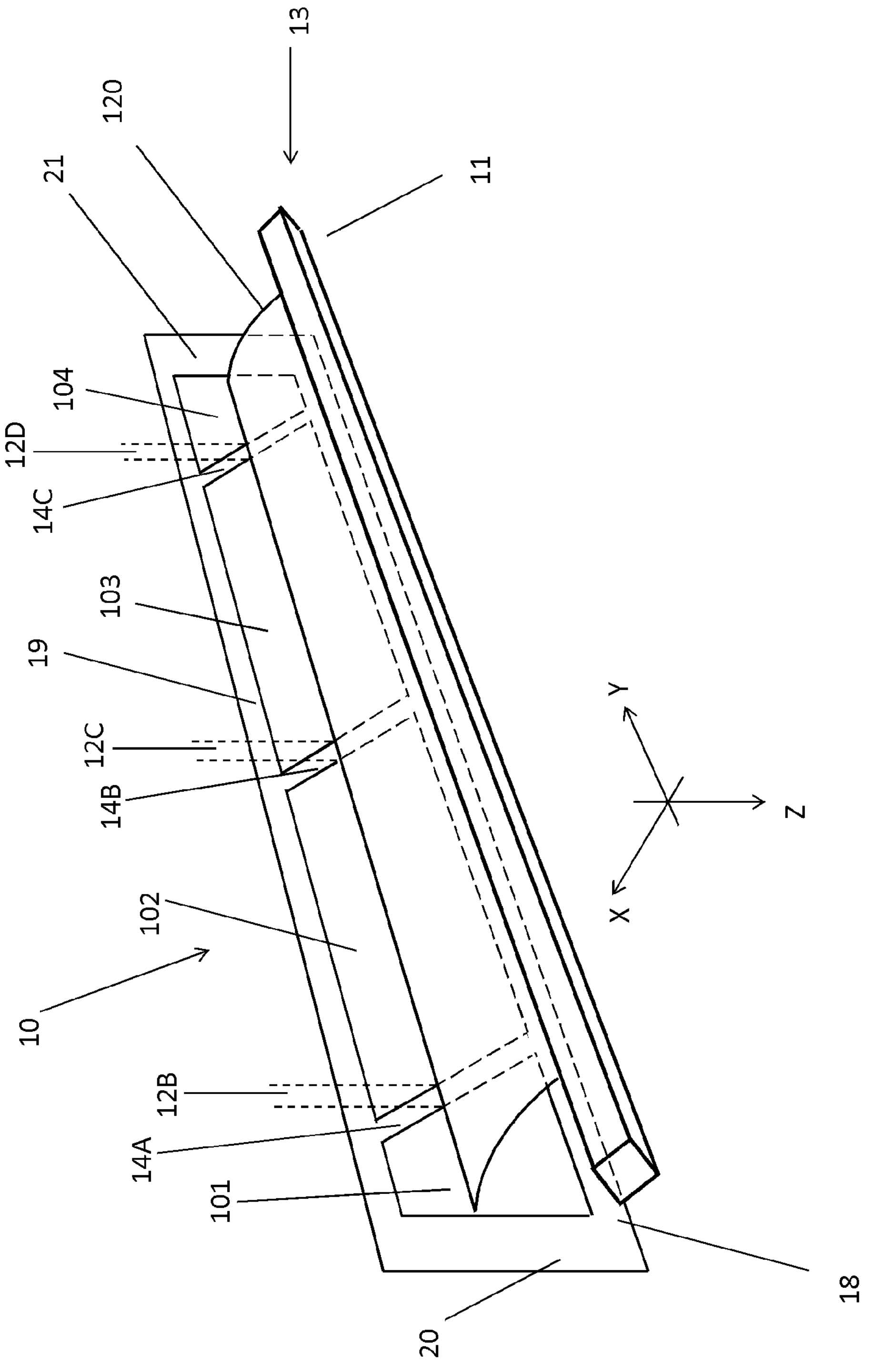
FIG. 16 is a diagram illustrating the state of a sheet that passes in front of the communication port in Example 2.

FIG. 16 is a diagram illustrating a state where the sheet 120 in Example 2 passes in front of the communication port 10. Although the tip end portion of the sheet 120 does not abut on the third communication port end portion 20 and the fourth communication port end portion 21, the tip end portion is bent while abutting on three oblique connecting portions 14 between the third communication port end portion 20 and the fourth communication port end portion 21. The connecting portions 14A, 14B, and 14C of the communication port 10 function as abutting portions that abut on the tip end portion of the sheet 120 and maintains the bent state of the sheet 120.

The state of deformation of a portion of the tip end portion of the sheet 120 at the position of the opening 102 is specified by the state of deformation of the portions 12B and 12C that abut on two abutting portions (the connecting portion 14A and the connecting portion 14B), which is the same as in Example 1. The same is true of the deformation of a portion of the tip end portion of the sheet 120 at the position of the opening 103.

Whereas, the conditions for the portion of the tip end portion of the sheet 120 at the position of the opening 101 are different from those in Example 1. That is, in Example 1, the state of deformation of the portion of the tip end portion of the sheet 12 at the position of the opening 101 is specified by the state of deformation of the portions 12A and 12B that abut on two abutting portions (the third communication port end portion 20 and the connecting portion 14A). In Example 2, the state of deformation is specified by the state of deformation of the portion 12B abutting on one abutting portion (connecting portion 14A). Here, the width of the portion of the tip end portion of the sheet 12 at the position of the opening 101 in the Y direction is sufficiently smaller than the overall width of the sheet 12 in the Y direction (30 mm or less in Example 2) as illustrated in FIG. 15. For this reason, bending deformation in the portion 12B abutting on one abutting portion (connecting portion 14A) is maintained in the portion at the position of the opening 101. The same is true of the deformation of a portion of the tip end portion of the sheet 120 at the position of the opening 104.

As described above, also in Example 2, when the sheet 120 passes in front of the communication port 10, the bending shape of the sheet 120 becomes substantially uniform in the Y direction. Thus, the same effects as those in Example 1 can be obtained.

Fifth Modification Example

Figure 17:
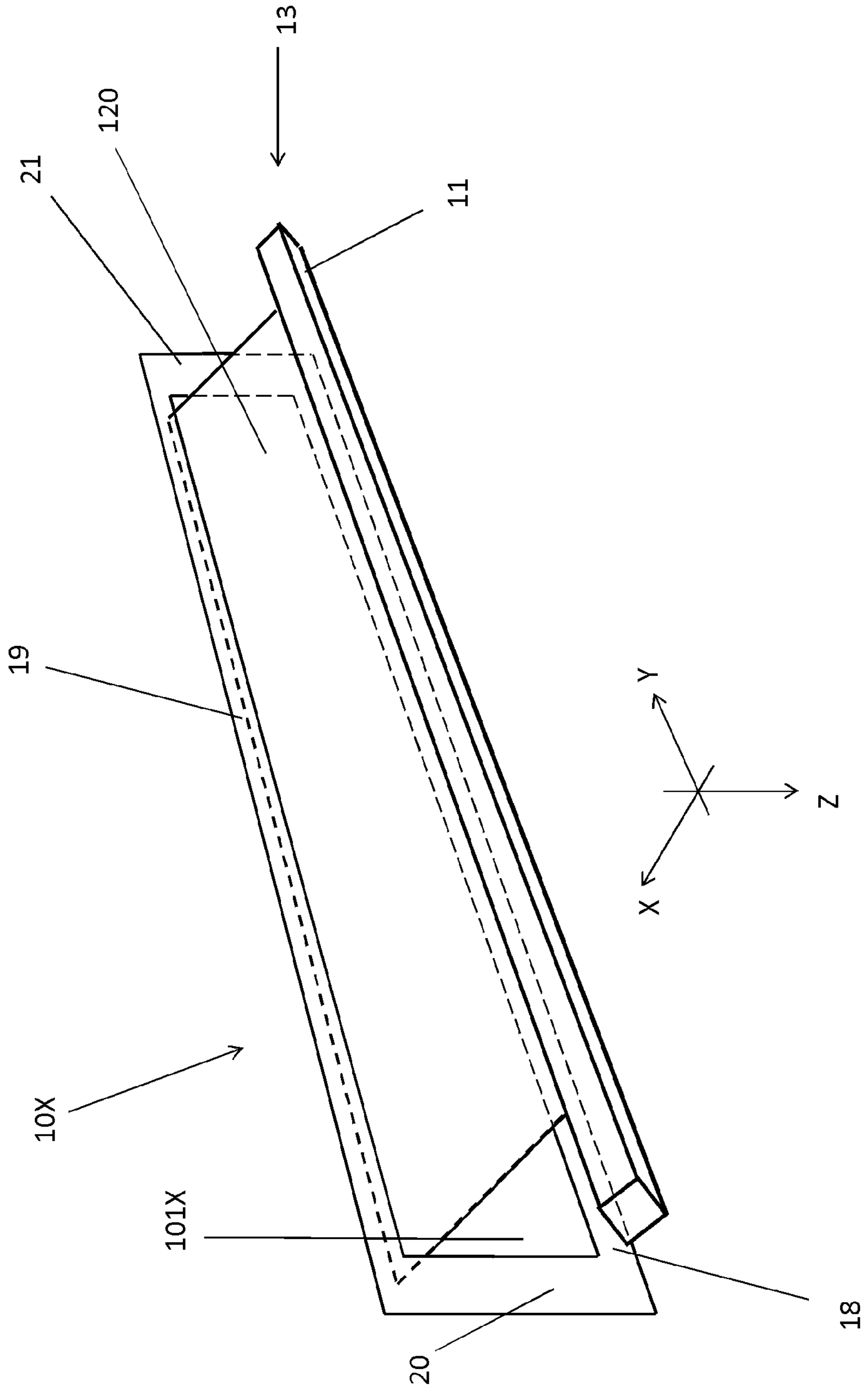
FIG. 17 is a diagram illustrating the state of a sheet that passes in front of a communication port in a fifth modification example.

A modification example of Example 2 will be described. FIG. 17 is a diagram illustrating a state where the sheet 120 passes in front of the communication port 10X in the fifth modification example. The fifth modification example differs from Example 2 in that there is no oblique connecting portion 14 between the third communication port end portion 20 and the fourth communication port end portion 21 of the communication port 10X. That is, a configuration of the communication port 10X is the same as that in the first modification example. The other configurations are the same as those in Example 2.

Figures 18A, 18B, 18C:
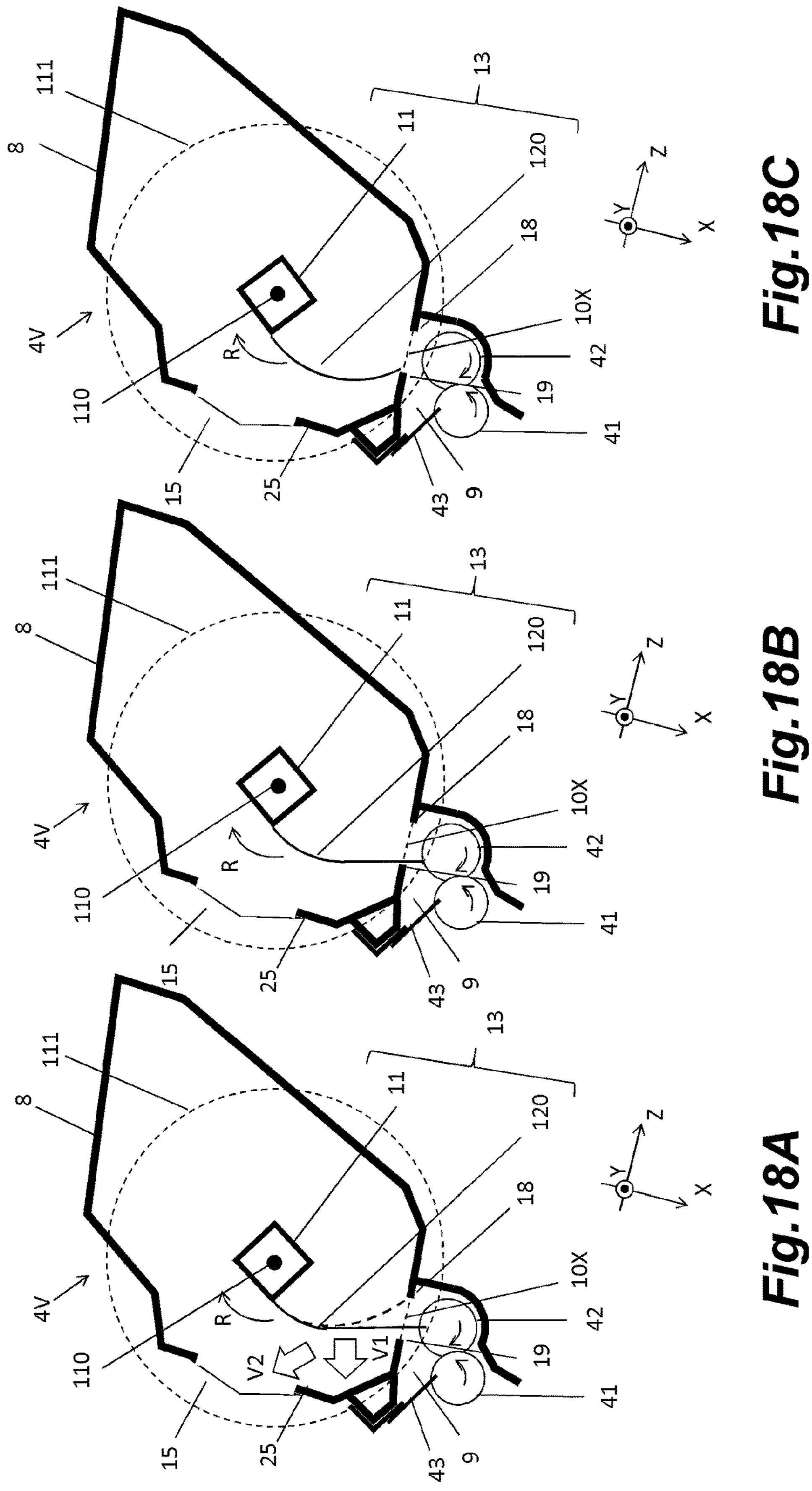
FIGS. 18A to 18C are diagrams illustrating a state where a sheet is deformed in the vicinity of a communication port in the fifth modification example.

FIGS. 18A to 18C are diagrams illustrating a state where the sheet 120 passes in front of the communication port 10X in the fifth modification example. FIGS. 18A to 18C illustrate the cross-section of a developing device in a state where a developing cartridge including the developing device is mounted on the apparatus main body of the image forming device 100. FIGS. 18A to 18C illustrate the cross-section of a developing device 4V in the fifth modification example which is taken along a plane that is perpendicular to the Y direction and passes through the remaining amount detection unit 15.

FIG. 18A illustrates a state immediately after the sheet 120 has passed through the first communication port end portion 18 of the communication port 10X. The sheet 120 indicated by a dashed line in FIG. 18A shows a state immediately before the sheet 120 passes through the first communication port end portion 18 in an overlapping manner for comparison.

When the sheet 120 passes through the first communication port end portion 18 and reaches an opening 101X of the communication port 10, the bending of the elastic sheet 120 is released instantaneously, and the state indicated by a dashed line in FIG. 18A changes to a state indicated by a solid line. Due to such rapid deformation of the sheet 120, a toner held on the downstream surface (front surface) of the conveyance member 13 in the rotation direction is extruded in directions indicated by arrows V1 and V2 in FIG. 18A. For this reason, there is a possibility that an unintended toner will adhere to the remaining amount detection unit 15, or that the amount of toner conveyed to the remaining amount detection unit 15 will vary greatly.

FIG. 18B illustrates a state where the sheet 120 is further rotated from the position illustrated in FIG. 18A and comes into contact with the second communication port end portion 19. In the fifth modification example, the sheet 120 passing in front of the communication port 10X is not bent and deformed, and thus the surface of the conveyance member 13 on the downstream side in the rotation direction collides with the second communication port end portion 19.

FIG. 18C illustrates a state immediately after the sheet 120 has passed in front of the communication port 10X. The tip end portion, which extends in the Y direction, of the sheet 120 is uniformly bent while abutting on the inner wall surface of the bottom of the accommodation chamber 8. The state of bending deformation of the sheet 120 in the state of FIG. 18C is substantially the same as the state in Example 1 illustrated in FIG. 1C.

In the fifth modification example, a toner held at the tip end portion of the sheet 120 is scraped off by the second communication port end portion 19 when the state of FIG. 18B changes to the state of FIG. 18C.

Whereas, in Example 2, as in the fifth modification example, an increase in variation in the amount of toner conveyed to the remaining amount detection unit 15 due to unintended adhesion, extrusion, or scraping of a toner to the remaining amount detection unit 15 is suppressed, and thus a remaining amount of toner can be detected with higher accuracy than in the fifth modification example.

From the above-described examples and modification examples, it can be understood that the behavior of the sheet 12 when passing in front of the communication port 10 changes depending on a size relationship between the width of the opening of the communication port 10 in the Y direction and the width of the sheet 12 in the Y direction, or the presence or absence of the connecting portion provided at the opening of the communication port 10.

Example 3

Figure 19:
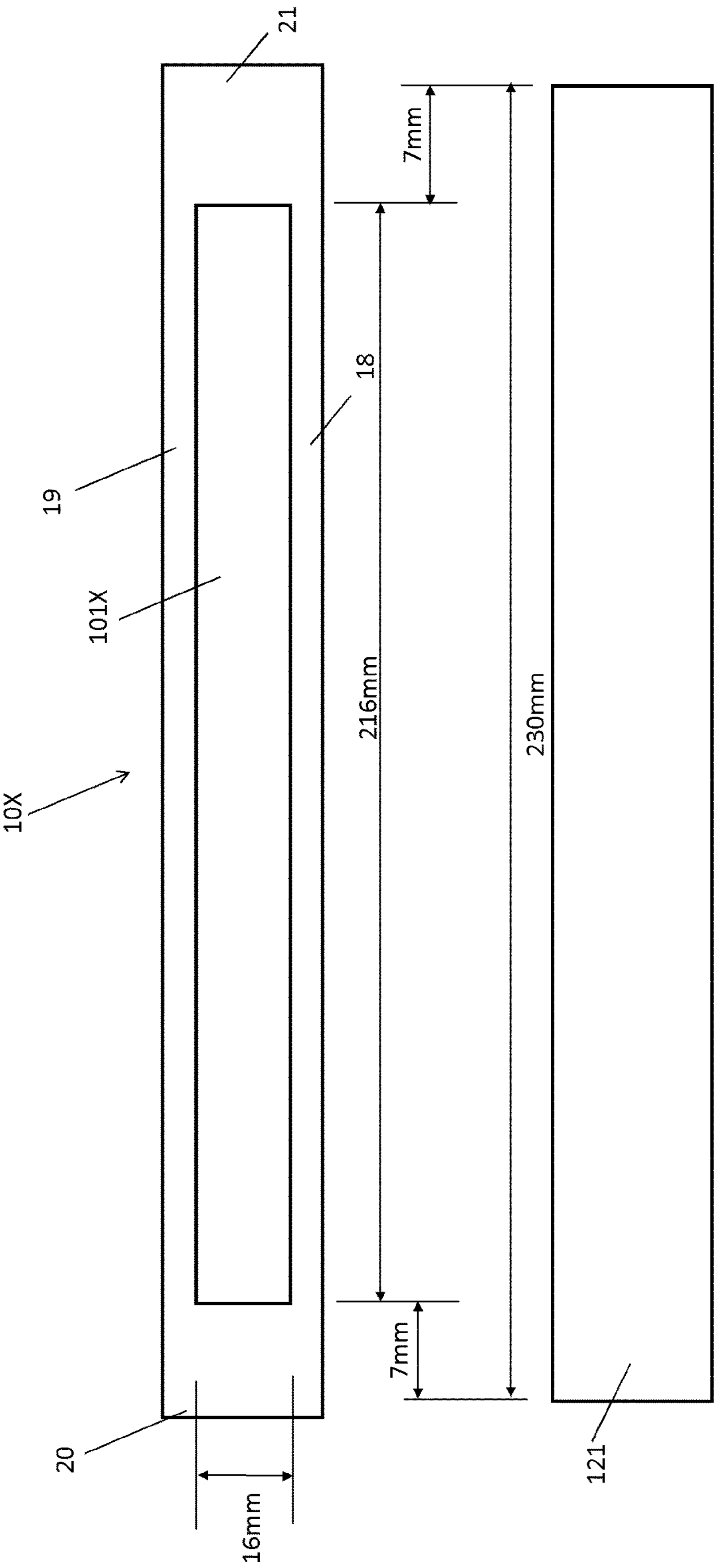
FIG. 19 is a diagram illustrating a configuration of a communication port and a positional relationship with a sheet in Example 3.

FIG. 19 is a diagram illustrating a configuration of the communication port 10X and a positional relationship with the sheet 121 in Example 3. Example 3 differs from Example 1 in that there is no oblique connecting portion 14 between the third communication port end portion 20 and the fourth communication port end portion 21 of the communication port 10X, and the width of the sheet 121 in the Y direction is larger than that in Example 1. The other configurations are the same as those in Example 1. Unlike the first modification example of Example 1, Example 3 is configured such that the widths of portions 121A and 121E on which both ends of the sheet 121 in the Y direction and the third communication port end portion 20 and the fourth communication port end portion 21 abut in the Y direction are increased.

Figure 20:
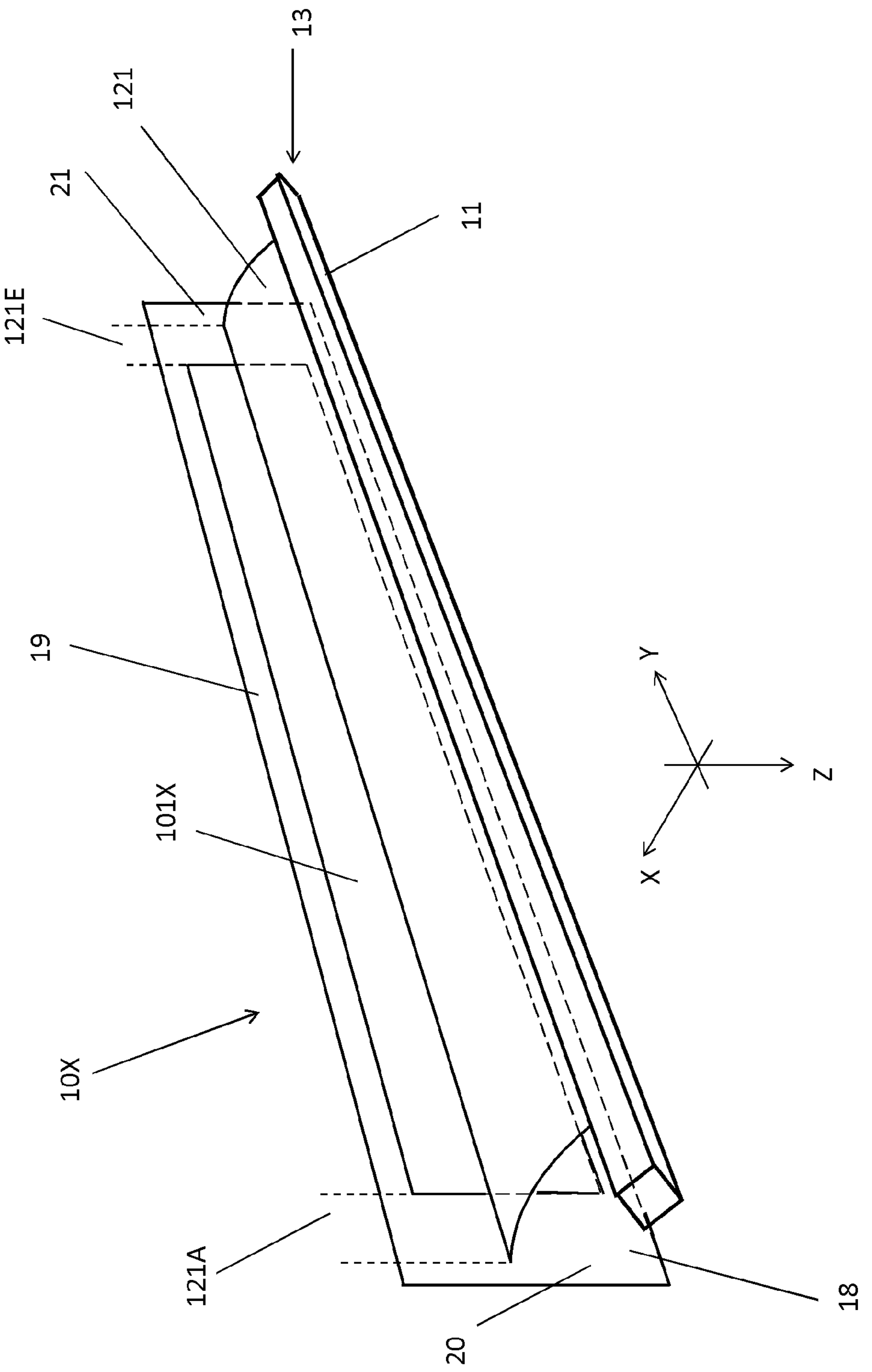
FIG. 20 is a diagram illustrating the state of a sheet that passes in front of the communication port in Example 3.

FIG. 20 is a diagram illustrating a state where the sheet 121 of the conveyance member 13 passes in front of the communication port 10X in Example 3. In Example 3, the width of the sheet 121 in the Y direction is 230 mm, and the width of the communication port 10X in the Y direction is 216 mm. The tip end portion of the sheet 121 is bent while abutting on a portion of the third communication port end portion 20 which is close to the opening 101X with a width of 7 mm and abutting on a portion of the fourth communication port end portion 21 which is close to the opening 101X with a width of 7 mm.

Unlike Example 1, there is no connecting portion 14 in Example 3, and thus the tip end portion of the sheet 121 is bent while abutting on the communication port 10X at two portions 121A and 121E. A portion of the third communication port end portion of the communication port 10X which is close to the opening 101X and a portion of the fourth communication port end portion 21 which is close to the opening 101X function as abutting portions that abut on the tip end portion of the sheet 121 and maintain the bent state of the sheet 121.

The state of deformation of the portion of the tip end portion of the sheet 121 at the position of the opening 101X is specified by the state of deformation of the portions 121A and 121E abutting on the abutting portions (the third communication port end portion 20 and the fourth communication port end portion 21) adjacent to both sides thereof in the Y direction.

In the first modification example, the widths (2 mm) of the portions 12A and 12E abutting on the abutting portions (the third communication port end portion 20 and the fourth communication port end portion 21) in the Y direction are smaller than the width of the sheet 12 in the Y direction. For this reason, the state of deformation of the central portion (a portion distant from the abutting portion) of the sheet 12 in the Y direction is greatly different from the state of deformation of the portions 12A and 12E abutting on the abutting portions.

Whereas, in Example 3, the widths (7 mm) of the portions 121A and 121E abutting on the abutting portions (the third communication port end portion 20 and the fourth communication port end portion 21) in the Y direction are sufficiently secured with respect to the width of the sheet 12 in the Y direction. For this reason, the state of deformation of the central portion (a portion distant from the abutting portion) of the sheet 121 in the Y direction is close to the state of deformation of the portions 121A and 121E abutting on the abutting portions, and the sheet 121 is uniformly bent and deformed in the Y direction.

According to Example 3, the sheet 121 is bent in a manner similar to that in Example 1 while a connecting portion is not provided in the communication port 10X, and thus effects similar to those in Example 1 can be obtained.

Example 4

Example 4 has a configuration in which a cleaner of the remaining amount detection unit 15 is added to the configuration in Example 1.

In the remaining amount detection unit 15 that optically detects a remaining amount of toner as described in FIGS. 6A and 6B in Example 1, when dirt adheres to an optical component, the transmission of light is inhibited, and the accuracy of detection is reduced. In particular, in a developing device that adopts an electrophotographic system, a micron-order toner having chargeability is used, and thus the toner is charged by a contact with the conveyance member 13, the accommodation chamber 8, or the like and can electrostatically adhere to an optical component. Thus, a cleaner is provided to remove dirt adhering to the surface of the optical component, and thus it is possible to improve the accuracy of detection of a remaining amount of toner.

Figure 21:
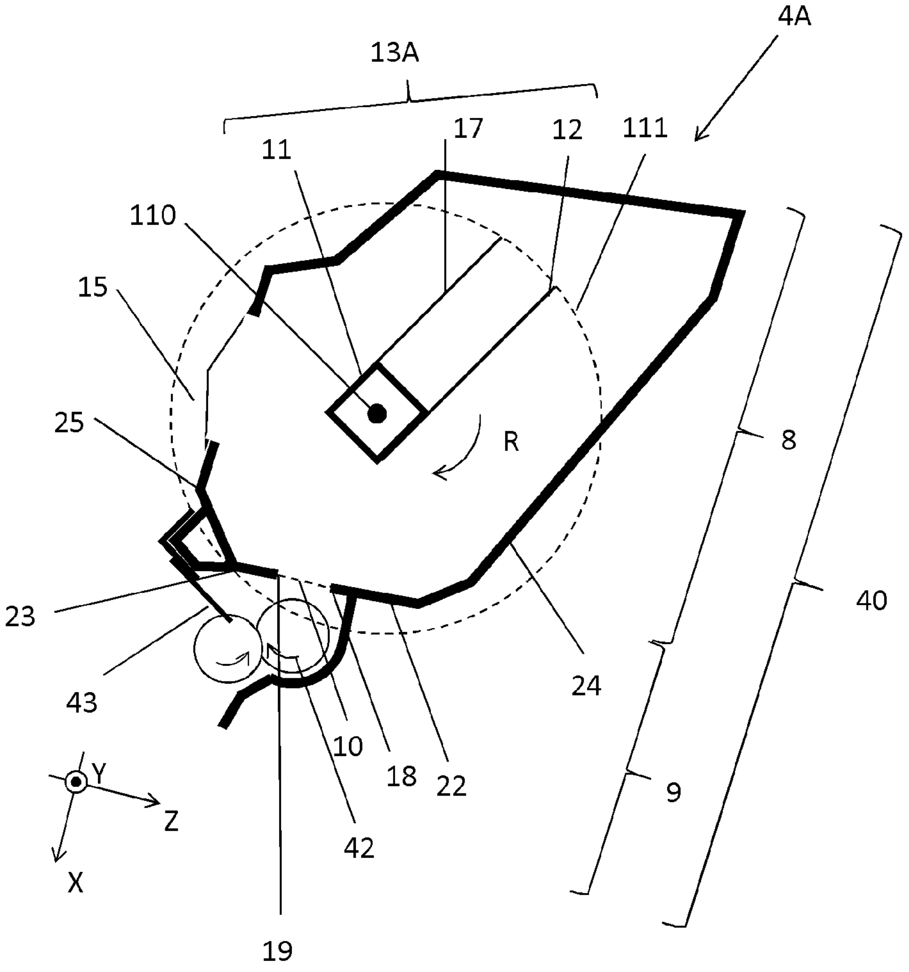
FIG. 21 is a diagram illustrating a developing device provided with a cleaner in Example 4.

FIG. 21 is a diagram illustrating a configuration construction of a developing device having a cleaner in Example 4. FIG. 21 illustrates the cross-section of the developing device in a state where a developing cartridge including the developing device is mounted on the apparatus main body of the image forming device 100. FIG. 21 illustrates the cross-section of a developing device 4A which is taken along a plane that is perpendicular to the Y direction and passes through the remaining amount detection unit 15. Example 4 differs from Example 1 in that a cleaner 17 is provided in addition to the sheet 12 on a rotation shaft 11 of a conveyance member 13A. The other configurations are the same as those in Example 1.

The cleaner 17 is a flexible elastic second sheet having a first end fixed to the rotation shaft 11, and is provided on an upstream side (rear side) of the sheet 12 (first sheet) in the rotation direction R in the rotation shaft 11. When the sheet 12 passes near the remaining amount detection unit 15 and a toner is conveyed to the light path 154 of the remaining amount detection unit 15, the toner may adhere to the remaining amount detection unit 15. In Example 4, the cleaner 17 passes through the remaining amount detection unit 15 after the sheet 12 has passed through the remaining amount detection unit 15, and cleaning is performed by rubbing light transmitting members (the light emitting portion 153, the light receiving portion 155, or and the like) constituting the remaining amount detection unit 15 by a second end on a side opposite to the first end of the cleaner 17. Thereby, even when the toner conveyed by the sheet 12 adheres to the remaining amount detection unit 15, the adhered toner can be removed. In Example 4, a cleaner formed of polyethylene terephthalate (PPS) and having a thickness of 100 μm was used as the cleaner 17.

A length from the first end of the cleaner 17 (the rotation axis of the rotation shaft 11) to the tip end of the second end of the cleaner 17 in an unbent state is longer than a distance from the rotation axis of the rotation shaft 11 to the light transmitting members of the remaining amount detection unit 15. Thereby, the cleaner 17 abuts on the side downstream inner wall surface 25 provided with the remaining amount detection unit 15 and passes the remaining amount detection unit 15 in a bent state. In addition, a length from the rotation axis of the cleaner 17 to the tip end of the cleaner 17 in an undeformed state is longer than distances from the rotation axis of the cleaner 17 to the bottom downstream inner wall surface 23, the communication port 10, the bottom upstream inner wall surface 22, and the side upstream inner wall surface 24. Thereby, similarly to the sheet 12, the cleaner 17 rotates while maintaining a bent state before and after passing in front of the communication port 10.

Relationship Between Cleaner and Oblique Connecting Portion

Figure 22:
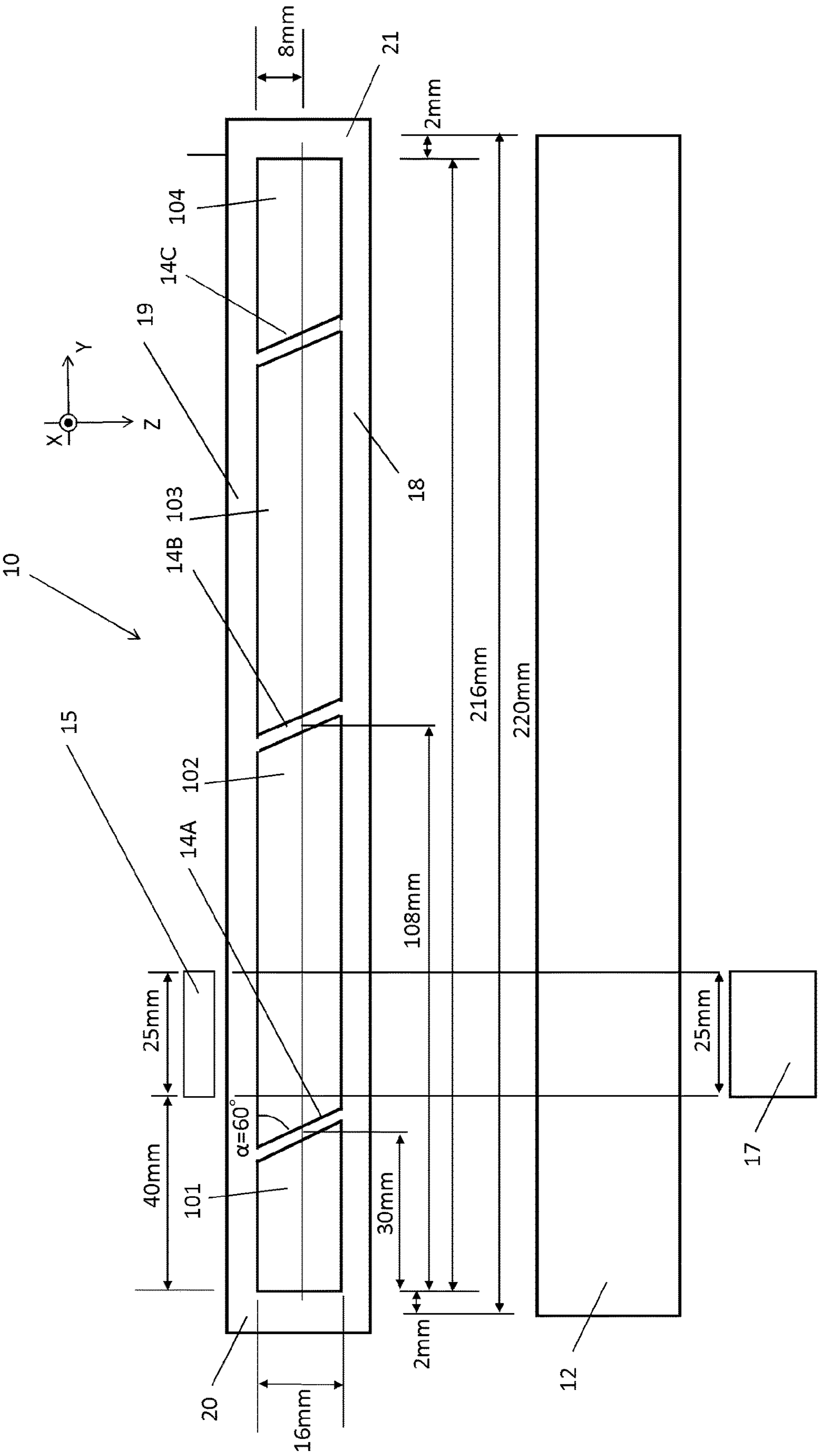
FIG. 22 is a diagram illustrating a configuration of a communication port and a positional relationship between a remaining amount detection unit, a sheet, and a cleaner in Example 4.

FIG. 22 is a diagram illustrating a configuration of the communication port and a positional relationship between the remaining amount detection unit, the sheet, and the cleaner in Example 4. The configurations and arrangement of the communication port 10, the remaining amount detection unit 15, and the sheet 12 are the same as those in Example 1 described with reference to FIG. 4.

As illustrated in FIG. 22, in Example 4, the cleaner 17 is added corresponding to the position of the remaining amount detection unit 15. In FIG. 22, the cleaner 17 is drawn adjacent to the sheet 12 in addition to the configuration of FIG. 4, but this is for describing a positional relationship between the cleaner 17, the remaining amount detection unit 15, the communication port 10, and the sheet 12.

The position and width in the Y direction of the cleaner 17 are determined in accordance with the position and width in the Y direction of the remaining amount detection unit 15. In Example 4, the width of the cleaner 17 in the Y direction is 25 mm, which is the same as the width of the remaining amount detection unit 15 in the Y direction. In Example 4, the cleaner 17 is set to be located at a position and to have a width such that it does not abut on the connecting portion 14. Thus, the position of the remaining amount detection unit 15 in the Y direction does not fall within a range in which the connecting portion 14 is provided in the Y direction.

Figure 23:
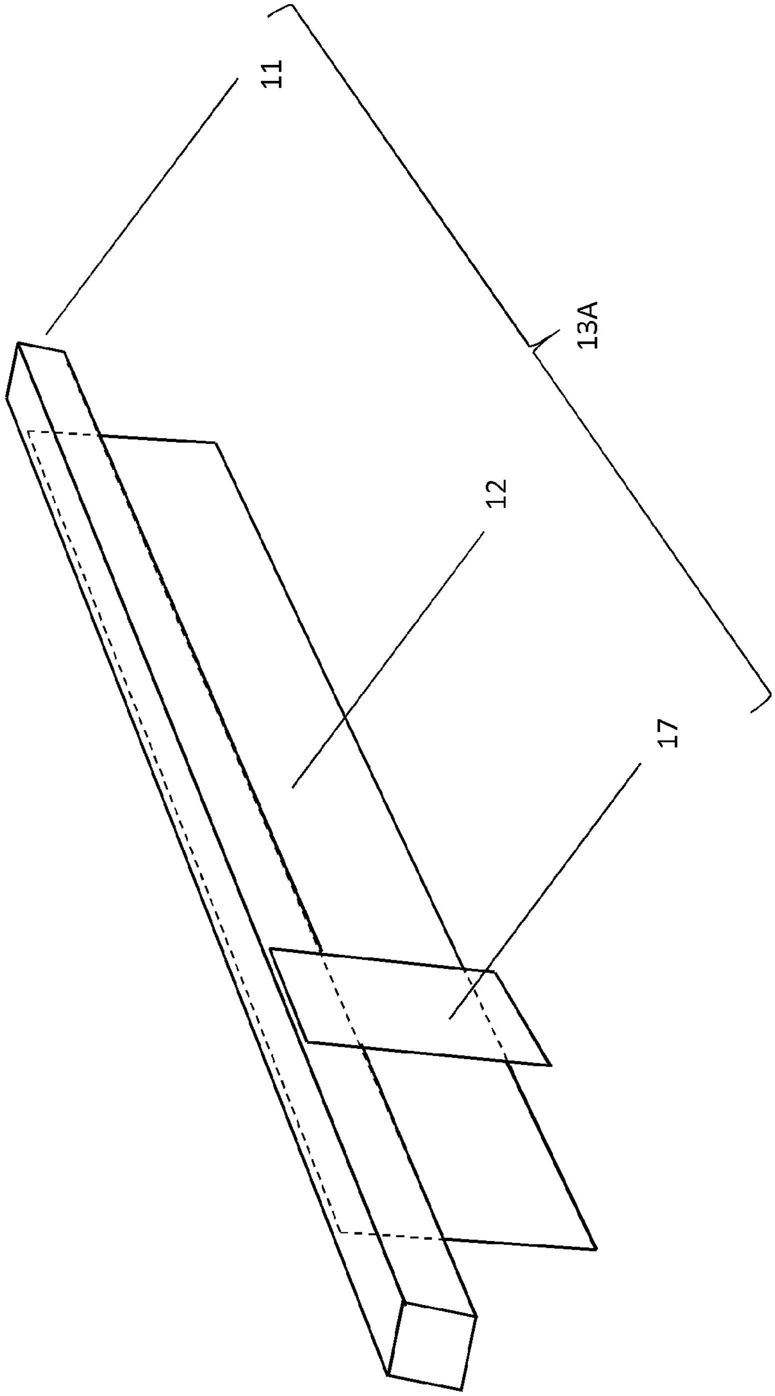
FIG. 23 is a diagram illustrating a configuration of a conveyance member in Example 4.

FIG. 23 is a perspective view illustrating a configuration of the conveyance member 13 in Example 4. As illustrated in FIG. 23, the cleaner 17 and the sheet 12 are fixed to the same rotation shaft 11.

Effects of Example 4

Figure 24:
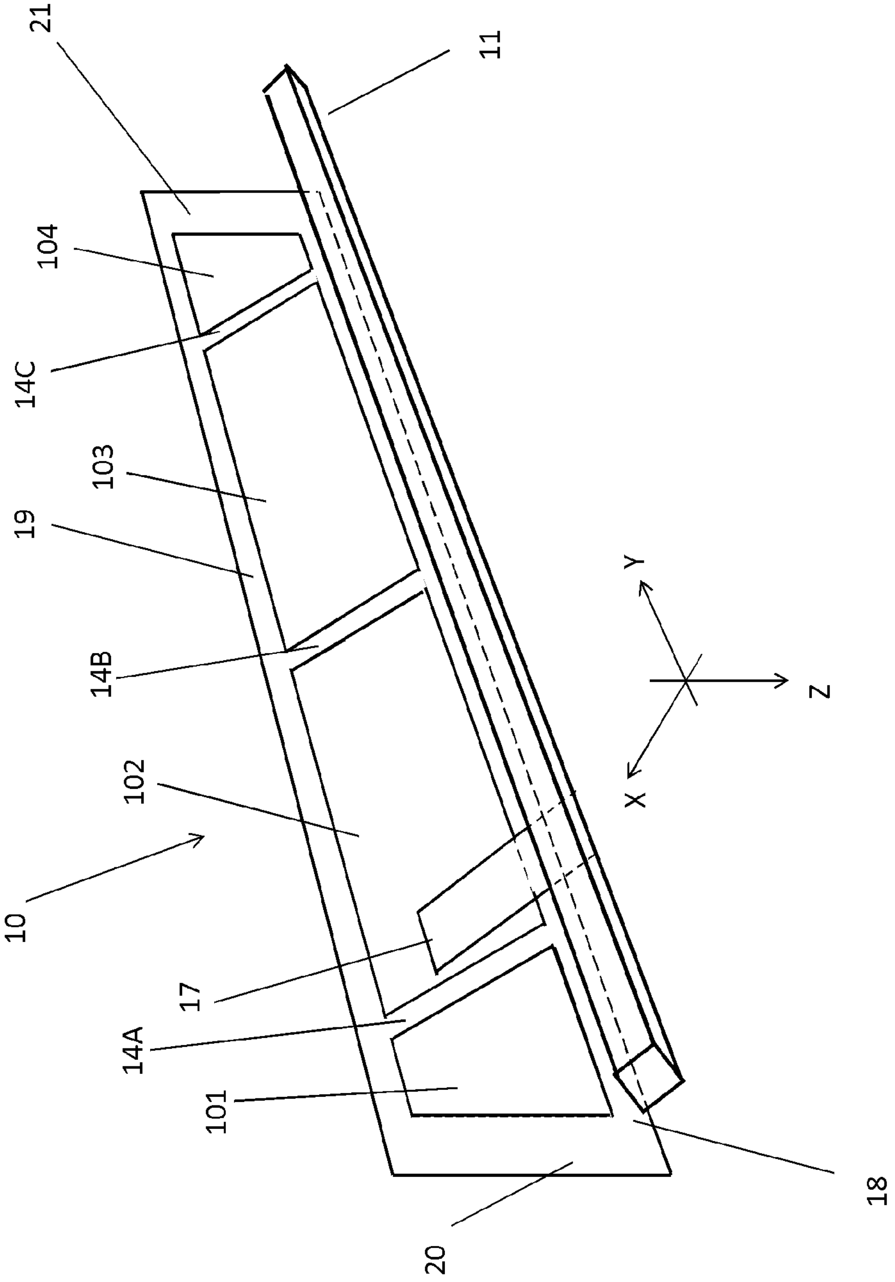
FIG. 24 is a diagram illustrating the state of the cleaner that passes in front of the communication port in Example 4.

FIG. 24 is a diagram illustrating a state where the cleaner 17 in Example 4 is passing in front of the communication port 10. Note that the sheet 12 is not illustrated in FIG. 24 in order to avoid complication of the drawing. As illustrated in FIG. 24, the cleaner 17 does not abut on the connecting portion 14, and thus bending deformation of the cleaner 17 is released immediately after the cleaner 17 passes through the first communication port end portion 18, and the cleaner 17 protrudes into the developing chamber 9.

Figures 25A, 25B, 25C:
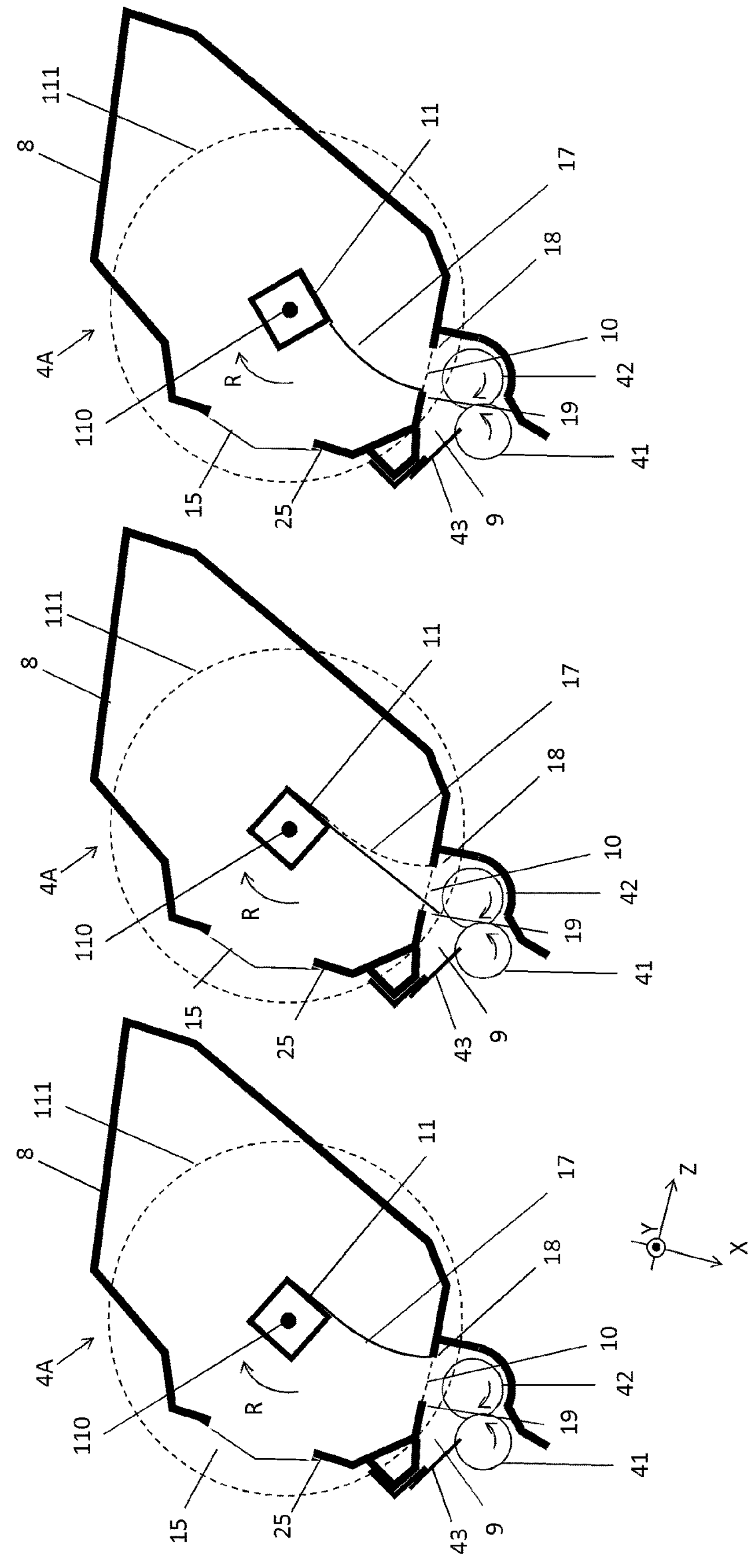
FIGS. 25A to 25C are diagrams illustrating a state where the cleaner is deformed in the vicinity of the communication port in Example 4.

FIGS. 25A to 25C are diagrams illustrating the state of deformation when the cleaner 17 in Example 4 passes in front of the communication port 10. FIGS. 25A to 25C illustrate the cross-section of a developing device in a state where a developing cartridge including the developing device is mounted on the apparatus main body of the image forming device 100. FIGS. 25A to 25C illustrate the cross-section of a developing device 4A which is taken along a plane that is perpendicular to the Y direction and passes through the remaining amount detection unit 15. The sheet 12 is not illustrated in FIGS. 25A to 25C.

FIG. 25A is a diagram illustrating a state immediately before the cleaner 17 passes through the first communication port end portion 18. The cleaner 17 is bent while abutting on the bottom upstream inner wall surface 22 immediately before passing through the first communication port end portion 18. FIG. 25B is a diagram illustrating a state immediately after the cleaner 17 has passed through the first communication port end portion 18. Immediately after the cleaner 17 has passed through the first communication port end portion 18, there is no counterpart member to be abutted, and the bending thereof is released. When the bending of the cleaner 17 is released, a toner adhering to the surface of the cleaner 17 is flipped off. FIG. 25C is a diagram illustrating a state where the cleaner 17 has further rotated from the state of FIG. 25B and has come into contact with the second communication port end portion 19. The tip end portion of the cleaner 17, which has come into contact with the second communication port end portion 19, moves to the bottom downstream inner wall surface 23 in a bent state. At this time, the toner adhering to the tip end portion of the cleaner 17 is scraped off. As described above, in Example 4, the toner adhering to the surface of the cleaner 17 is removed when the cleaner 17 passes in front of the communication port 10, and thus it is more effectively perform cleaning of the remaining amount detection unit 15 by the cleaner 17.

In this manner, when the cleaner 17 is provided, it is preferable that the position of the cleaner 17 provided in the Y direction be a position where there is no connecting portion 14 from the viewpoint of refreshing the surface of the cleaner 17. In other words, it is preferable that the connecting portion 14 as the abutting portion do not abut on the tip end portion of the cleaner 17 while the tip end portion of the cleaner 17 passes in front of the communication port 10. In order to stabilize the bending deformation of the sheet 12 at the position where the sheet 12 passes through the remaining amount detection unit 15, it is preferable that the position where the sheet 12 passes through the remaining amount detection unit 15 be a position in the vicinity of the abutting portion (connecting portion 14) that maintains the bent state of the sheet 12 or be a position between two abutting portions. Considering both, it is preferable from the viewpoint of cleaning performance of the cleaner 17 and the stability of toner conveyance of the sheet 12 to provide the remaining amount detection unit 15 at a position between the two abutting portions (connecting portions 14).

Sixth Modification Example

Figure 26:
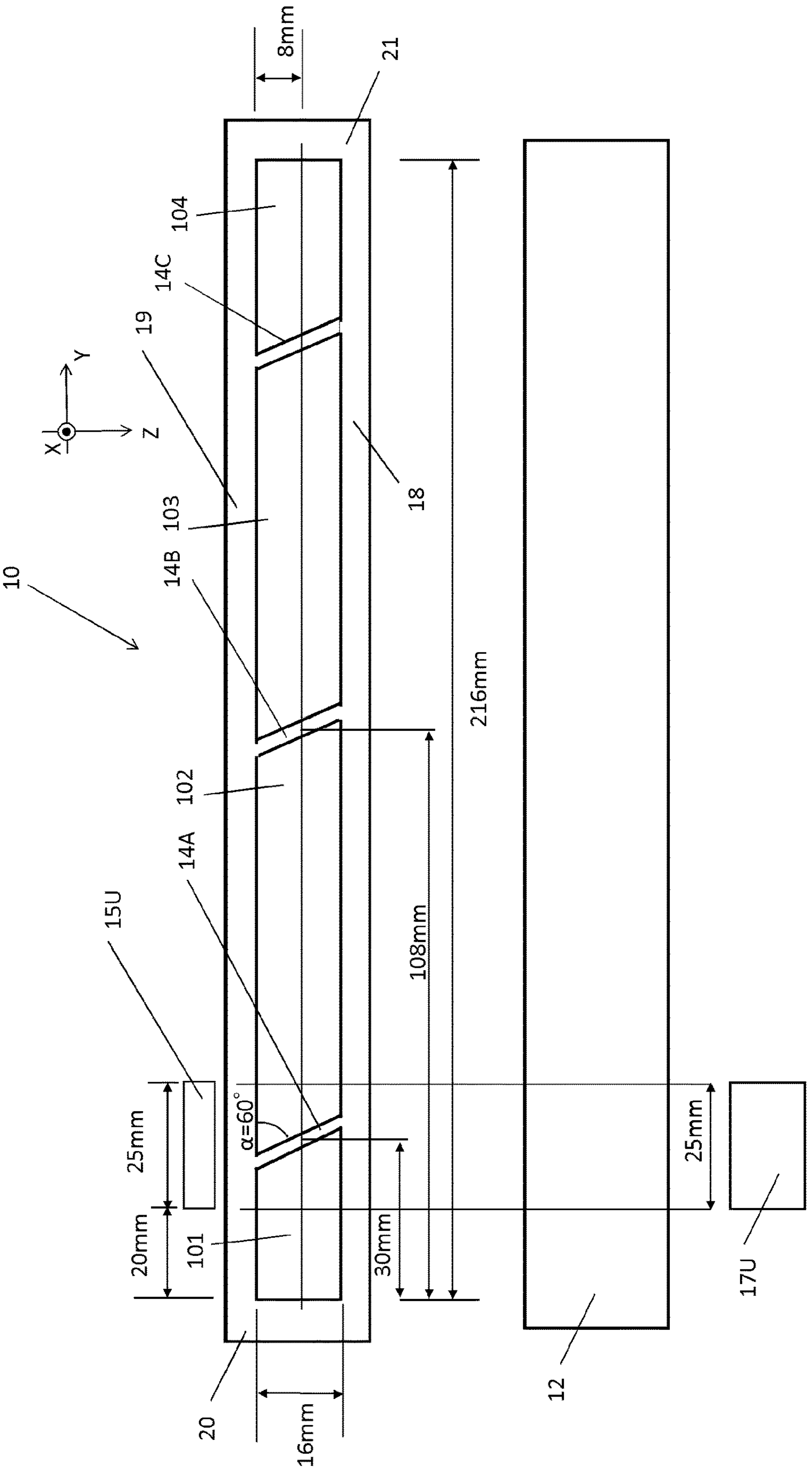
FIG. 26 is a diagram illustrating a configuration of a communication port and a positional relationship between a remaining amount detection unit, a sheet, and a cleaner in a sixth modification example.

A modification example of Example 4 will now be described. FIG. 26 is a view illustrating a configuration of a communication port 10 and a positional relationship between a remaining amount detection unit 15U, a sheet 12, and a cleaner 17U in a sixth modification example. A difference between the sixth modification example and Example 4 is that a connecting portion 14A is within a range in which the remaining amount detection unit 15U and the cleaner 17U are present in the Y direction. The other configurations are the same as those in Example 4.

Figure 27:
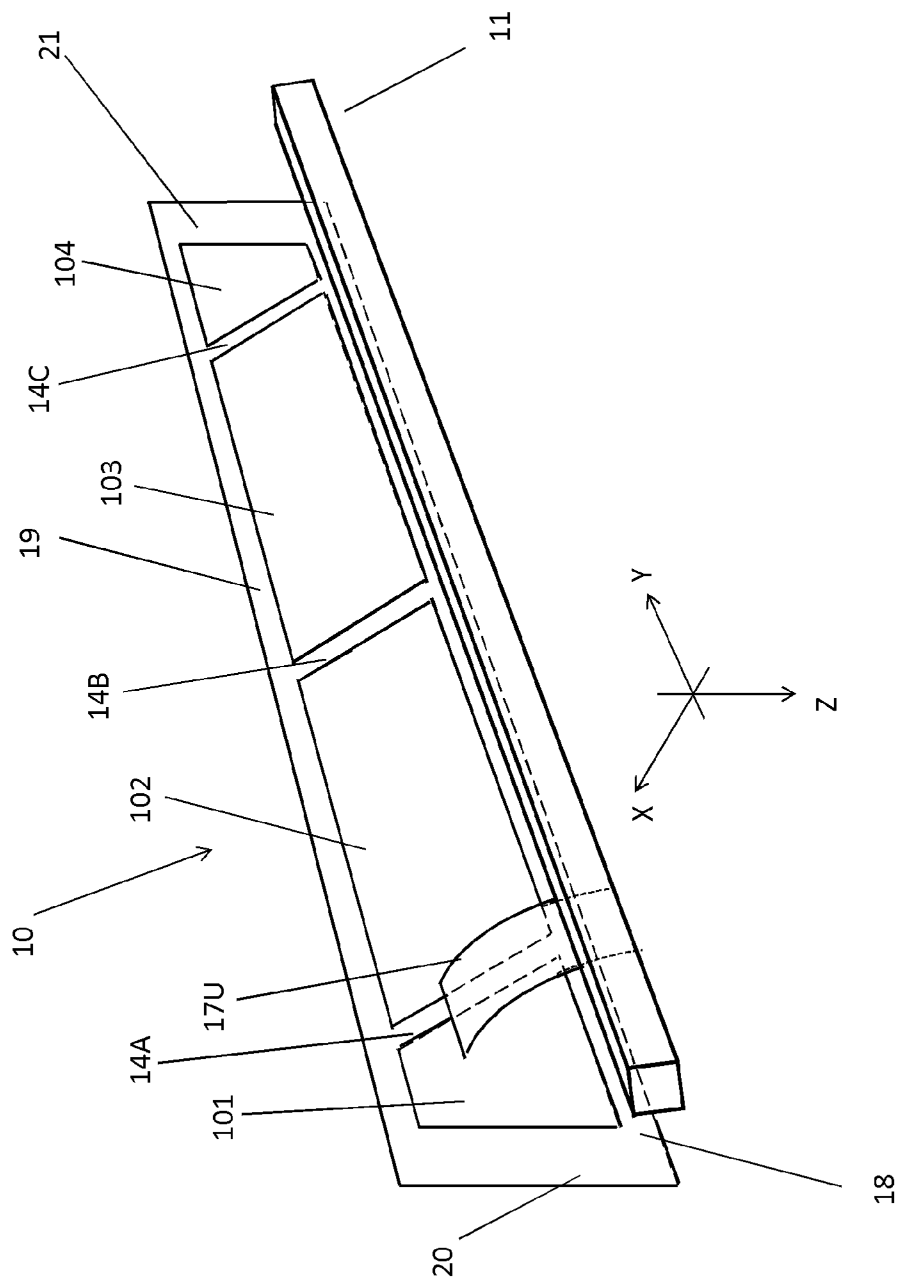
FIG. 27 is a diagram illustrating the state of the cleaner that passes in front of the communication port in the sixth modification example.

FIG. 27 is a view illustrating the state of the cleaner 17U that passes in front of the communication port 10 in the sixth modification example. As illustrated in FIG. 27, the connecting portion 14A is within a range in which the cleaner 17U is provided in the Y direction, and thus the tip end portion of the cleaner 17U is bent while abutting on the connecting portion 14A when passing in front of the communication port 10.

Figures 28A, 28B, 28C:
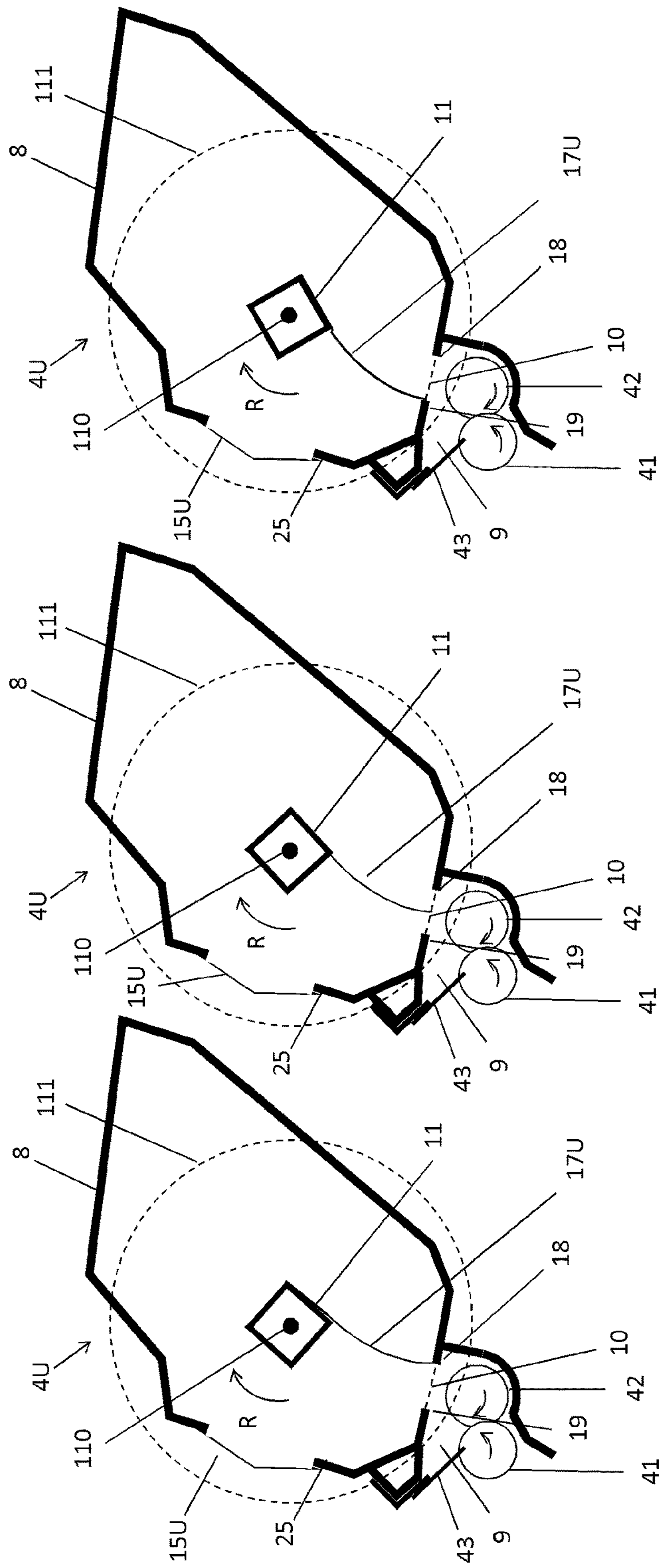
FIGS. 28A to 28C are diagrams illustrating a state where the cleaner is deformed in the vicinity of the communication port in the sixth modification example.

FIGS. 28A to 28C are views illustrating the state of deformation when the cleaner 17U in the sixth modification example passes in front of the communication port 10. FIGS. 28A to 28C illustrate the cross-section of a developing device in a state where a developing cartridge including the developing device is mounted on the apparatus main body of the image forming device 100. FIGS. 28A to 28C illustrate the cross-section of a developing device 4U which is taken along a plane that is perpendicular to the Y direction and passes through the remaining amount detection unit 15U. The sheet 12 is not illustrated in FIGS. 28A to 28C.

In the sixth modification example, the cleaner 17U abuts on the connecting portion 14A when passing in front of the communication port 10, and rotates while maintaining its bent state. For this reason, it is not possible to obtain an effect of removing a toner adhering to the surface of the cleaner 17U when passing through the first communication port end portion 18 and the second communication port end portion 19 as described in Example 4. There is a possibility that the remaining amount detection unit 15U cannot be sufficiently cleaned. Thus, it is possible to more reliably perform cleaning of the remaining amount detection unit 15 by the cleaner 17 in Example 4 than in the sixth modification example.

Example 5

In the above-described examples, description has been given of an example of a configuration in which a light transmitting member provided on the inner wall surface (side downstream inner wall surface 25) of the accommodation chamber 8 is provided as a detection means for detecting a remaining amount of toner in the accommodation chamber 8, and the light transmitting member measures light having passed through the light path 154 formed in the accommodation chamber 8. Here, the configuration of the detection means in the present disclosure is not limited to such an optical type. In Example 5, description will be given of an example in which the present disclosure is applied to a developing device including a detection means for detecting a remaining amount of toner in the accommodation chamber 8 by measuring a change in capacitance between a pair of electrodes provided in the accommodation chamber 8.

Figure 29:
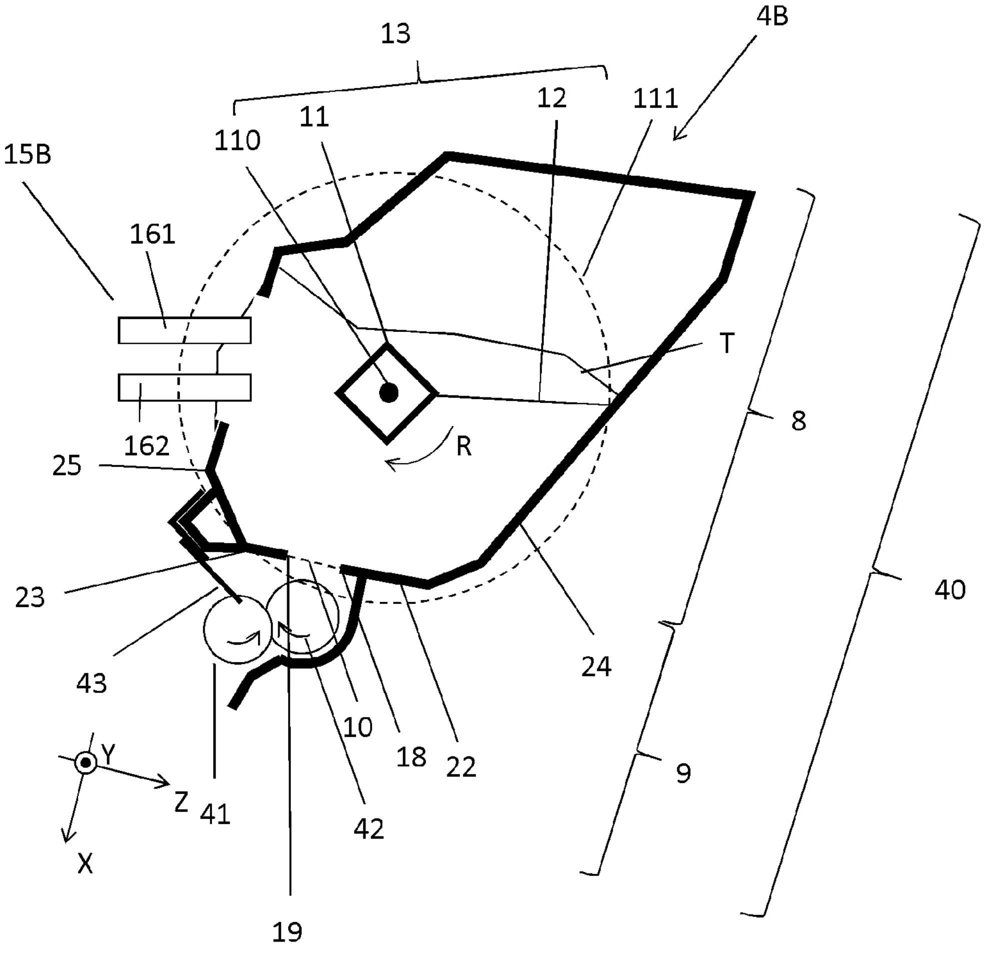
FIG. 29 is a diagram illustrating a developing device in Example 5.

FIG. 29 is a diagram illustrating a developing device 4B according to Example FIG. 29 illustrates the cross-section of the developing device in a state where a developing cartridge including the developing device is mounted on the apparatus main body of the image forming device 100. FIG. 29 illustrates the cross-section of the developing device 4B which is taken along a plane that is perpendicular to the Y direction and passes through a remaining amount detection unit 15B. In Example 5, in a state where the developing device 4 is provided in the apparatus main body of the image forming device 100, and the image forming device 100 is installed on a horizontal plane (the state of use), a pair of electrodes 161 and 162 configured to be able to apply a voltage from the outside of the accommodation chamber 8 are provided above the communication port 10. The pair of electrodes 161 and 162 are flat plate electrodes and the electrode 161 faces the electrode 162, and portions thereof are exposed in the accommodation chamber 8 to form a capacitor in the accommodation chamber 8. In a state where a remaining amount of toner in the accommodation chamber 8 is sufficiently large, the electrodes 161 and 162 are filled with a toner. When the remaining amount of toner decreases, the toner is between the electrodes when the toner is conveyed to the remaining amount detection unit 15B by the tip end portion of the sheet 12 of the conveyance member 13, and the toner is not between the electrodes in the other cases. Thus, similarly to the optical remaining amount detection units 15 in Examples 1 to 4, capacitance between the electrodes changes depending on a remaining amount of toner. In addition, capacitance between the electrodes changes depending on the rotation phase of the conveyance member 13. Based on the change in capacitance, a remaining amount of toner can be detected. For example, the capacitance between the pair of electrodes increases as a remaining amount of toner between the electrodes increases, and thus a change in the capacitance can be measured by applying a voltage to one of the pair of electrodes 161 and 162 and measuring a current output from the other electrode.

As in Examples 1 to 4, in Example 5, there is provided an abutting portion that abuts the second end portion of the sheet 12 so as to maintain the bent state of the sheet 12 until the second end of the sheet 12 passes in front of the communication port 10 from the upstream end of the communication port 10 and then reaches the remaining amount detection unit 15B. Thus, it is possible to stably convey a toner to the remaining amount detection unit 15B and accurately detect the remaining amount of toner by the remaining amount detection unit 15B.

Note that various configurations such as the communication port 10, the sheet 12, the cleaner 17, and the like which are described in Examples 1 to 4 and their respective modification examples can also be combined with Example 5 including the electrostatic capacitance type remaining amount detection unit 15B as much as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102252, filed on Jun. 24, 2022, which is hereby incorporated by reference herein in its entirety.

What is claimed is:

1. A developing device for use in an apparatus main body of an image forming device, the developing device comprising:

a developing container including an accommodation chamber configured to accommodate a developer and a developing chamber communicating with the accommodation chamber through a communication port, the accommodation chamber and developing chamber being integrally formed such that the developing chamber is disposed below the accommodation chamber in a state where the developing device is in use in the apparatus main body;

a developer carrier configured to carry the developer accommodated in the developing chamber;

a conveyance member provided in the accommodation chamber and including a rotation shaft rotatable about a rotation axis and a sheet which is rotatable together with the rotation shaft, is flexible, and has a first end portion fixed to the rotation shaft in a direction perpendicular to the rotation shaft axis, the conveyance member being configured to convey the developer in the accommodation chamber toward the developing chamber through the communication port by the sheet while being rotated; and a light guide provided in the accommodation chamber of the developing container, the light guide being configured to guide light from outside of the developing device into the accommodation chamber and from inside of the accommodation chamber toward outside of the developing device and being positioned above the communication port when the developing device is in use in the apparatus main body;

wherein the developer container includes an abutting surface which forms the accommodation chamber and which is configured to abut a second end portion of the sheet opposite to the first end portion of the sheet in the direction perpendicular to the rotation axis such that the sheet is maintained in a bent state until the second end portion of the sheet passes in front of an upstream end of the communication port in a rotation direction of the conveyance member and then reaches the light guide.

2. The developing device according to claim 1, wherein the communication port is positioned inside a virtual circle centered on the rotation axis, the virtual circle having a radius equal to a length from the rotation axis to a tip end of the second end portion of the sheet in a state where the sheet is not bent.

3. The developing device according to claim 2, wherein an inner wall surface of the accommodation chamber from a downstream end of the communication port to the light guide is provided inside the virtual circle.

4. The developing device according to claim 1, wherein the abutting surface is configured to abut against the second end portion of the sheet from a predetermined position on an upstream side of the communication port in the rotation direction until the second end portion of the sheet passes in front of the communication port and then reaches the light guide.

5. The developing device according to claim 1, wherein the abutting surface includes an inner wall surface of the accommodation chamber in a range from a downstream end of the communication port to the light guide in the rotation direction.

6. The developing device according to claim 1, wherein the abutting surface includes at least one connector connecting between an upstream end of the communication port and a downstream end of the communication port in the rotation direction.

7. The developing device according to claim 6, wherein the at least one connector extends, in a direction intersecting with the rotation axis, from the upstream end of the communication port to the downstream end of the communication port.

8. The developing device according to claim 6, wherein a position of the at least one connector is different, in a direction of the rotation axis, from a position of the light guide.

9. The developing device according to claim 6, wherein the at least one connector is a plurality of connectors, and wherein the abutting surface includes the plurality of connectors, the plurality of connectors being provided at intervals in the direction of the rotation axis, and the light guide is positioned between adjacent two of the plurality of connectors in the direction of the rotation axis.

10. The developing device according to claim 1, wherein a width of the sheet in a direction of the rotation axis is larger than a width of the communication port in the direction of the rotation axis, and the abutting surface includes an inner wall surface of the accommodation chamber adjacent to an end of the communication port in a direction of the rotation axis.

11. The developing device according to claim 1, wherein, in a state where the developing device is in use in the apparatus main body, the communication port is positioned at a bottom of the accommodation chamber, and the abutting surface includes an inner wall surface of the accommodation chamber at the bottom of the accommodation chamber.

12. The developing device according to claim 11, wherein, in a state where the developing device is in use in the apparatus main body, the light guide is positioned at a side portion that extends upward from the bottom of the accommodation chamber, and the abutting surface includes an inner wall surface at the side portion of the accommodation chamber.

13. The developing device according to claim 1, wherein, in a state where the developing device is in use in the apparatus main body, the developer carrier is positioned below the communication port.

14. The developing device according to claim 1, wherein, in a state where the developing device is in use in the apparatus main body, the communication port is positioned below the rotation axis.

15. The developing device according to claim 1, wherein, in a state where the developing device is in use in the apparatus main body, the communication port is positioned below the rotation axis, and the developer carrier is positioned below the communication port.

16. The developing device according to claim 1, wherein the sheet is a first sheet, and wherein the developing device includes the first sheet and a second sheet which is flexible and has a third end portion fixed to the rotation shaft in the direction perpendicular to the rotation axis, the third end portion being fixed on an upstream side of the first sheet in the rotation direction on the rotation shaft; and the developing device further includes a cleaner which is configured to clean the light guide by rubbing the light guide with a fourth end portion of the second sheet opposite to the third end portion in the direction perpendicular to the rotation axis.

17. The developing device according to claim 16, wherein a length from the rotation axis to a tip of the fourth end portion of the second sheet in an unbent state is longer than a distance from the rotation axis to the light guide.

18. The developing device according to claim 16, wherein the abutting surface does not abut on the fourth end portion of the second sheet while the fourth end portion of the second sheet passes in front of the communication port.

19. The developing device according to claim 1, wherein the developing device is attachable to and detachable from the apparatus main body.

* * * * *